US006424749B1

United States Patent
Zhu et al.

(10) Patent No.: US 6,424,749 B1
(45) Date of Patent: Jul. 23, 2002

(54) SYSTEM AND METHOD FOR SCALING COMBINED VIDEO AND COMPUTER GENERATED IMAGERY

(75) Inventors: Daniel Qiang Zhu, Columbus; Kevin John Stec, Medford, both of NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/281,554

(22) Filed: Mar. 30, 1999

(51) Int. Cl.[7] .............................. G06T 5/10; G06T 5/50; G06T 3/40; H04N 7/01
(52) U.S. Cl. ........................ 382/260; 382/275; 382/279; 382/300; 345/615; 345/632; 345/552; 345/441
(58) Field of Search ................................. 382/260, 275, 382/279, 298, 300; 345/611, 615, 629, 632; 348/441, 552

(56) References Cited

U.S. PATENT DOCUMENTS

| 5,057,911 A | 10/1991 | Stec et al. ................... 348/642 |
| 5,446,804 A | 8/1995 | Allebach et al. ............ 382/298 |
| 5,587,742 A | 12/1996 | Hau et al. .................... 348/441 |

FOREIGN PATENT DOCUMENTS

EP  0651578  10/1994 ............ H04N/7/24

OTHER PUBLICATIONS

High Performance Multirate Digital Filter, Gennum Corporation, Ontario, Canada, Doc No. 520–64–5.
Texas Instruments Digital Light Processing Technology Set to Revolutionize Movie Presentation Mar. 10, 1999, Press Release.
K. Turkowski, Several Filters for Sampling Rate Conversion, Technical Report No. 9, Apple Computer, May 1998.
E. Maeland, On the Comparison of Interpolation Methods, Eurographics 88', pp. 421–428.
T. Laakso et al., Splitting the Unit Delay, IEEE Signal Processing Magazine, vol. 13, No. 1, 1996.
K. Stec, Filtering and Sampling, Digital Video: Algorithms and Interfaces, SIGGRAPH 98.
J. Ward et al., Resampling Algorithm for Image Resizing and Rotation, Proc. SPIE Processing Applications, vol. 1075, pp. 260–269, 1989.
D. Marr et al. Theory of Edge Detection, Proc. Of the Royal Society of London B., vol. 207 pp. 187–217.
European Search Report, Aug. 6, 2001.

*Primary Examiner*—Scott Rogers
(74) *Attorney, Agent, or Firm*—Ratner & Prestia

(57) ABSTRACT

A system and method for format conversion for use with images containing mixed video and computer generated imagery. A first intermediate scaled image is generated using a first interpolator which has a relatively wide passband and a narrow transition band to the stop band. This interpolator retains high frequency components in the interpolated image but may introduce ringing distortion adjacent to strong edges. The first intermediate scaled image is then processed through an edge extractor which extracts strong edges but ignores any associated ringing distortion. The output signal of the edge detector is a scaled edge image. Next, a second intermediate scaled image is generated using a second interpolator which has a narrower passband and a more gradual transition band. This interpolator produces an image having reduced high frequency components relative to the original image. Then the scaled edge image is added to the second ma intermediate scaled image to produce a converted image having substantially the same high frequency components as the first intermediate scaled image but no ringing distortion components.

13 Claims, 10 Drawing Sheets

SYSTEM AND METHOD FOR SCALING COMBINED VIDEO AND COMPUTER GENERATED IMAGERY

FIELD OF THE INVENTION

The present invention relates to the field of digital video format conversion. More specifically, the present invention relates to universal format conversion architecture which processes combined video and computer generated imagery.

BACKGROUND OF THE INVENTION

Today, in the digital television (DTV) post production environment, the use of video and computer generated imagery (CGI) of different formats has become commonplace. Format conversion of high quality, real time video raster CGI is becoming an integral part of the routine operation for efficient DTV content creation and delivery. Most existing video/graphics workstations rely on the CPU and its graphic-subsystem to perform image interpolation in software. When these software systems are used, incoming materials need to be rendered in a suitable format before image editing or composition can take place. A more productive alternative may be to use a dedicated hardware format converter (FC).

Due to the distinct signal characteristics (e.g., the bandwidth) of live video and CGI, however, a format converter optimized for scaling video is not necessarily suitable for CGI. Performance compromises such as image aliasing, ringing and blurring artifacts usually have to be made within a single interpolator design. To overcome the performance barrier constrained by one interpolator, there is a need for a new FC architecture for simultaneous video and CGI scaling.

In the advent of DTV age, the DTV transmission formats specified by ATSC have been adopted by all the major US TV networks. One TV network however, may be in favor of one DTV format while another network may prefer a different one. Multiple DTV formats will continue to complicate video post-production process since video/graphics workstations must be designed to work with multiple input and output formats. Therefore, format conversion is inevitable in DTV post-production and a practical solution must be found. While some high-end video/graphics workstations offer "resolution independence" by using software image interpolation, this results in a trade-off between operational speed and system resources allocation for image scaling tasks. To be more productive, a dedicated image-scaling hardware engine that operates efficiently with any mix of DTV-format sources is needed. This is particularly important for post processing companies wishing to serve a broad range of clients who will be working in a variety of standards. In addition, the ability to mix formats allows free use of all program assets, including both traditional video and computer generated imagery (CGI).

The distinctly different signal characteristics of traditional video and CGI are desirably taken into consideration in the design of a format converter. a Conventional wisdom is that all CGIs which have bandwidths that reach the Nyquist limit (ie., 0.5 cycle/pixel) are desirably passed through an anti-aliasing filter before they are scaled just to avoid ringing artifacts. Unnecessary antialiasing filtering for CGI image components, however, may cause image blurring which may diminish the visual appeal of these image components. On the other hand, it is desirable to maintain the bandwidth of CGI image components so that they may be properly displayed on digital display devices such as Plasma Display Panels (PDP) and Digital Light Processing (DLP) video projectors since these devices are capable of displaying CGI to its 0.5 cycle/pixel bandwidth limit. Because digital displays have 100% modulation transfer functions (MTFs), a graphics artist now has an opportunity to show off his artwork in the way that he intended to display it. There is a need for an architecture that can scale any CGI without trading graphics sharpness for other scaling artifacts (such as ringing) reduction.

SUMMARY OF THE INVENTION

The present invention provides a simple and effective means for a universal format conversion for use with images containing mixed video and computer generated imagery. A first intermediate scaled image is generated using a first interpolator. The first intermediate scaled image is then processed through an edge extractor to produce a scaled edge image. Next, a second intermediate scaled image is generated using a second interpolator. Then the scaled edge image is added to the second intermediate scaled image to produce a converted image.

In one embodiment a new format conversion architecture is based on dual FCs with the interpolators residing in the two FCs having complementary characteristics.

BRIEF DESCRIPTION OF THE DRAWINGS

The invention is best understood from the following detailed description when read in connection with the accompanying drawings. Included in the drawings are the following figures:

FIG. 1b is a graph of amplitude versus frequency, which shows the frequency response characteristic of the bilinear interpolation kernel shown in FIG. 1a.

FIG. 2b is a graph of amplitude versus frequency, which shows the frequency responses of the kaiser windowed sinc functions shown in FIG. 2a.

FIG. 3b is a graph amplitude versus frequency, which shows two exemplary frequency response characteristics for the raised-cosine functions shown in FIG. 3a.

FIG. 4b is a graph of frequency versus amplitude, which illustrates frequency response characteristics for each of the three phases shown in FIG. 4a.

DETAILED DESCRIPTION OF THE EXEMPLARY EMBODIMENT

The heart of a video and CGI format converter is an image scaler that transforms a digital image from one sampling lattice to another by re-sampling the original image in a 2D plane. Before designing an image scaler, it is important to understand the role that an interpolator plays in the image-scaling engine.

Image scaling for equally spaced data samples can be viewed as a convolution of a discrete interpolation function (or kernel) and the data samples. The numerical accuracy and computational complexity of an image scaler are directly linked to its interpolation kernel. As such, interpolation kernels are the targets of design and analysis in the creation of the interpolation algorithm. There are a number of interpolation kernels used for image scaling applications. The major differences are the tradeoffs among accuracy, efficiency and hardware complexity.

Bilinear interpolation is a very popular method used extensively by the PC manufacturers primarily for consumer video and graphics applications. In a 1-dimensional case, the output sample is calculated according to a weighted sum of its two neighboring samples, as shown in equation (1)

$$y(x) = \frac{x - x_0}{x_1 - x_0} y(x_1) + \frac{x_1 - x}{x_1 - x_0} y(x_0) \quad (1)$$

where $x_0$ and $x_1$ are the input sampling grid and x is the output sampling grid that lies between $x_0$ and $x_1$; y( ) is a function value (e.g., image intensity).

In the spatial domain, bilinear interpolation is equivalent to convolving the input with the interpolation kernel shown in equation (2):

$$h(x) = \begin{cases} 1 - |x| & 0 \le |x| \le 1 \\ 0 & \text{otherwise} \end{cases} \quad (2)$$

Figure 1A:
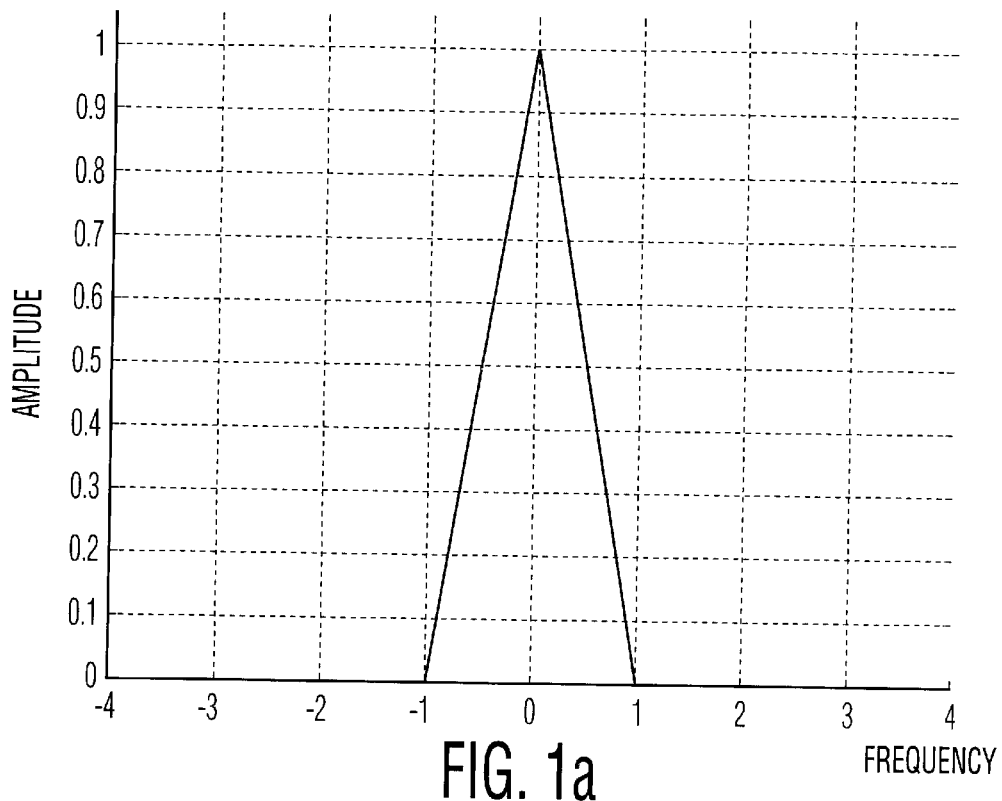
FIG. 1a is a graph of amplitude versus frequency, which shows the filter kernel of a bilinear interpolation.
Figure 1B:
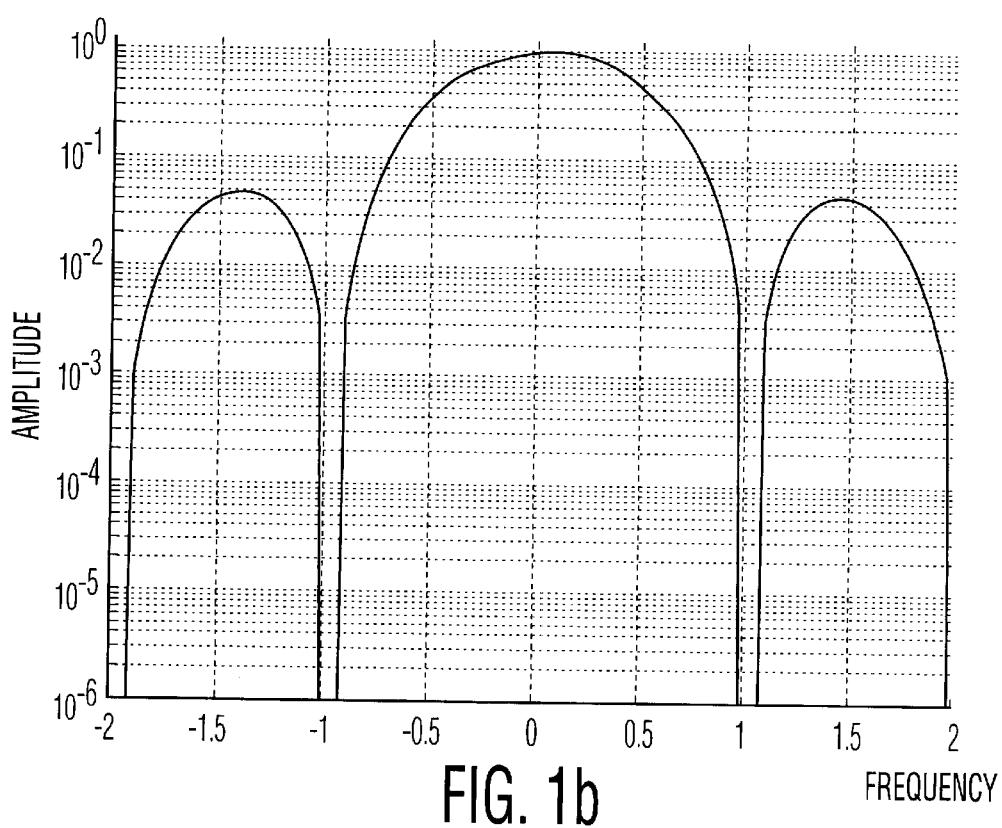

The waveform and the frequency response characteristics of a bilinear interpolation kernel are shown in FIGS. 1a and 1b, respectively. Although bilinear interpolation is very ecomonic to implement, it is rarely used to process professional quality video signals. It is evident from FIG. 1b, that the bilinear interpolation kernel has significant amounts of spurious stopband high-frequency component leakage which contributes to the aliasing. In addition, the passband is moderately attenuated, resulting in image smoothing. To prevent passband attenuation, the ideal frequency response for an kernel is a boxcar filter specified as equation (3)

$$H_{ideal}(f) = \begin{cases} 1 & 0 \le |f| \le 0.5 \\ 0 & \text{otherwise} \end{cases} \quad (3)$$

A comprised between a true boxcar interpolation filter and a filter having the frequency response characteristic shown in FIG. 1b is a third order interpolation filter. The motivation for third-order interpolation filtering (e.g., cubic B-spline) is to combine segments generated from polynomials, using a finite amount of support, to match the zero-crossings of a truncated sinc function. This type of kernel provides better interpolation accuracy than a bilinear interpolation kernel and requires only small support in the spatial domain. This allows an interpolation filter having a truncated sinc kernel to produce output samples with little computation. The nonlinear terms in the kernel, however, increase the cost of the hardware relative to a linear interpolation filter. In addition, the truncated sinc interpolation filter has undesired attenuation in the passband that could result in image smoothing.

Sampling theory has established that the sinc function is the ideal interpolation kernel. It is, however, physically unrealizable since it has infinite support in the spatial domain. In practice, a smoother "roll-off" windowing function with finite support is used to mitigate the ringing artifact as a result of direct sinc function truncation. Among the most popular window functions is the Kaiser window function, which is defined by equation (4):

$$k(x) = \begin{cases} \frac{I_0(\beta)}{I_0(\alpha)} & |x| \le \frac{N-1}{2} \\ 0 & \text{otherwise} \end{cases} \quad (4)$$

where β is a free parameter defined by equation (5):

$$\alpha = \beta \left[ 1 - \left( \frac{2x}{N-1} \right)^2 \right]^{-\frac{1}{2}} \quad (5)$$

The interpolation kernel is, therefore, the product of the Kaiser window function and the sinc function as set forth in equation (6)

$$h(x) = k(x) \frac{\sin(\pi x)}{\pi x} \quad (6)$$

Figure 2A:
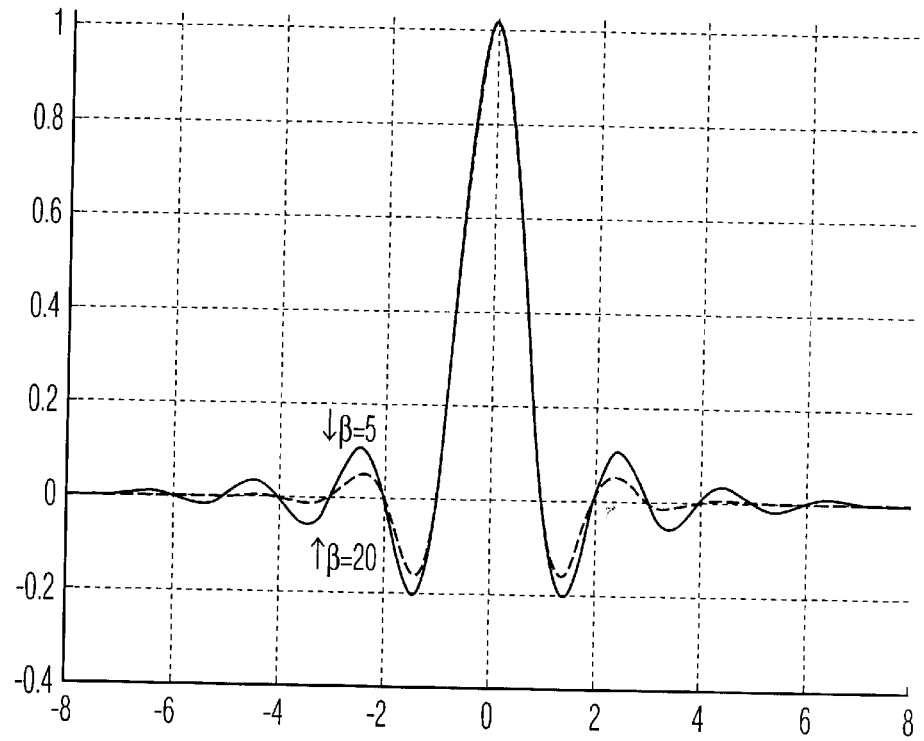
FIG. 2a is a graph of amplitude versus frequency, which shows two exemplary filter kernels for two Kaiser windowed sinc function.
Figure 2B:
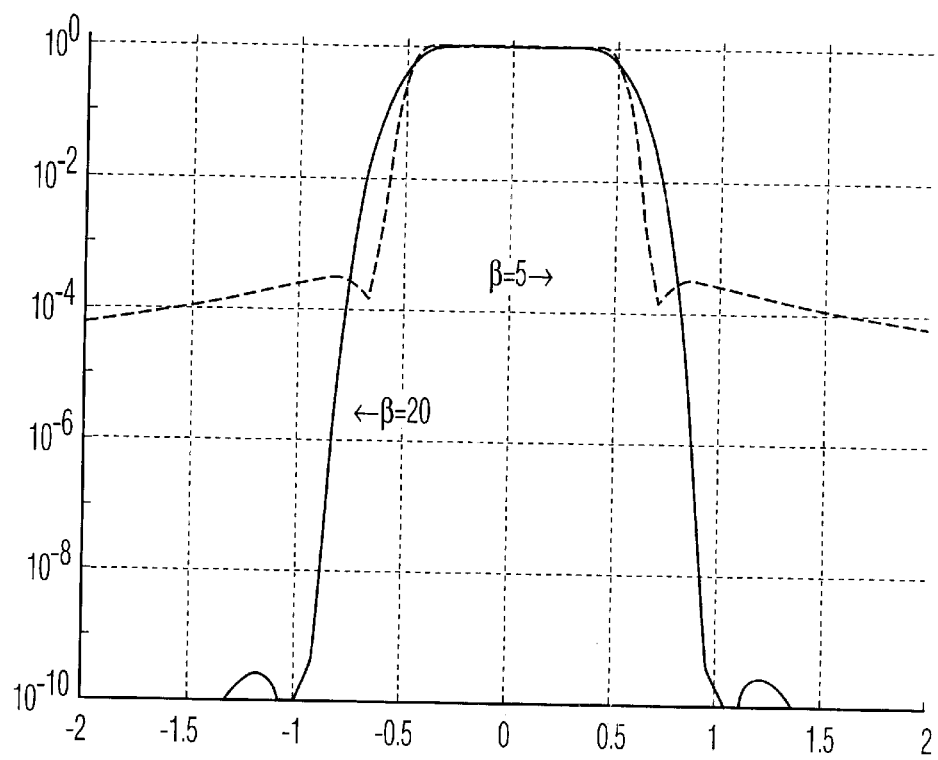

FIGS. 2a and 2b show the Kaiser-windowed sinc function with β=5 and 20, respectively. When β is increased, the tail in the spatial domain diminishes quickly. This increase in β translates in the frequency domain a narrower passband and a wider transition band, which may lead to more aliasing artifacts and image blurring. A more gradual transition band, however, produces reduced ringing artifacts near sharp edges. The choice between passband width and transition band width are balanced based on the application. For example, one may opt for a larger β for CGI scaling when edge ringing becomes the dominant artifact, while a smaller β may be suitable for natural video scaling due to the band-limiting characteristics that may be contributed by the video camera.

It is well known that filters based on windowed sinc functions tend to produce ringing artifacts near edges. Although they offer improvement over directly truncated sinc function, they retain a fairly sharp transition from passband to stopband. Therefore, it is desirable to impose smoothing constraints on the filter response in the frequency domain. When the desirable frequency response is defined to be a smooth function from the passband to the stopband, its impulse response decays much faster and may be truncated without explicit windowing.

One particular function which exhibits a smooth transition between the passband and the stopband is the raised-cosine function. Its corresponding interpolation kernel is defined by equation (7):

$$h(x) = \text{sinc}(x) \frac{\cos \pi \gamma x}{1 - (2\gamma x)^2} \qquad (7)$$

Like the sinc function, the raised-cosine function is physically unrealizable. However, the tails of the raised cosine function decay at a rate of $1/x^3$ and diminish more rapidly than the tails of the sinc function. In practice, the raised cosine function can be approximated by truncating the pulse at some integer number (integer multiple of the Nyquist period) depending upon the $\gamma$ value. It is understood that the parameter $\gamma$ (known as the roll-off parameter) controls the excess bandwidth varying from 0% to 100% of the minimum bandwidth with respect to that of the sinc function.

Figure 3A:
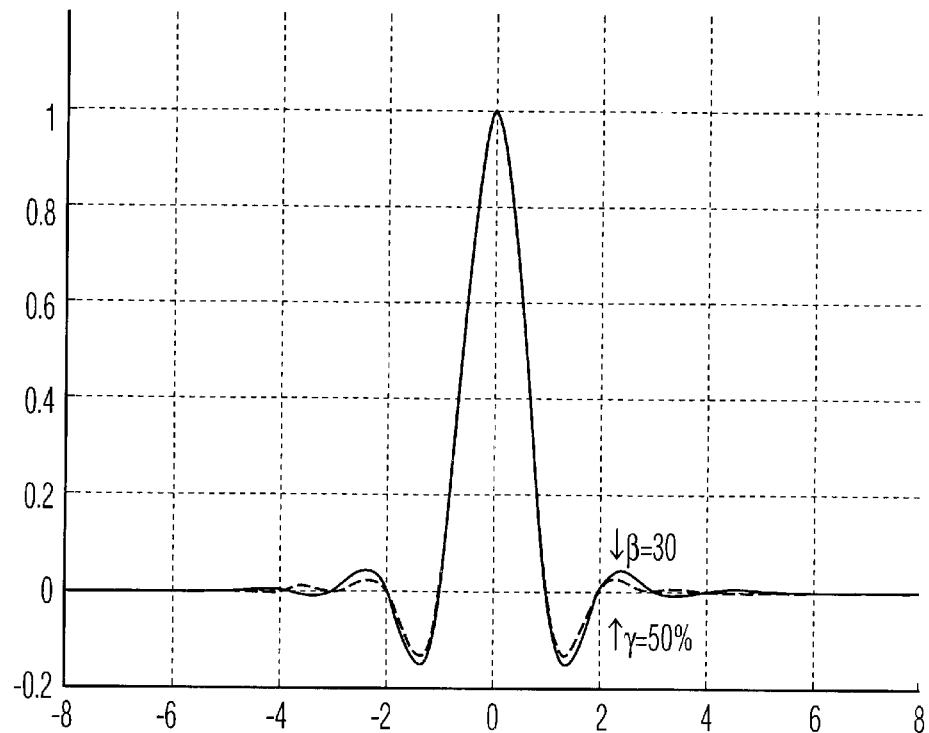
FIGS. 3a is a graph amplitude versus frequency, which shows two exemplary filter kernels for two raised-cosine functions.
Figure 3B:
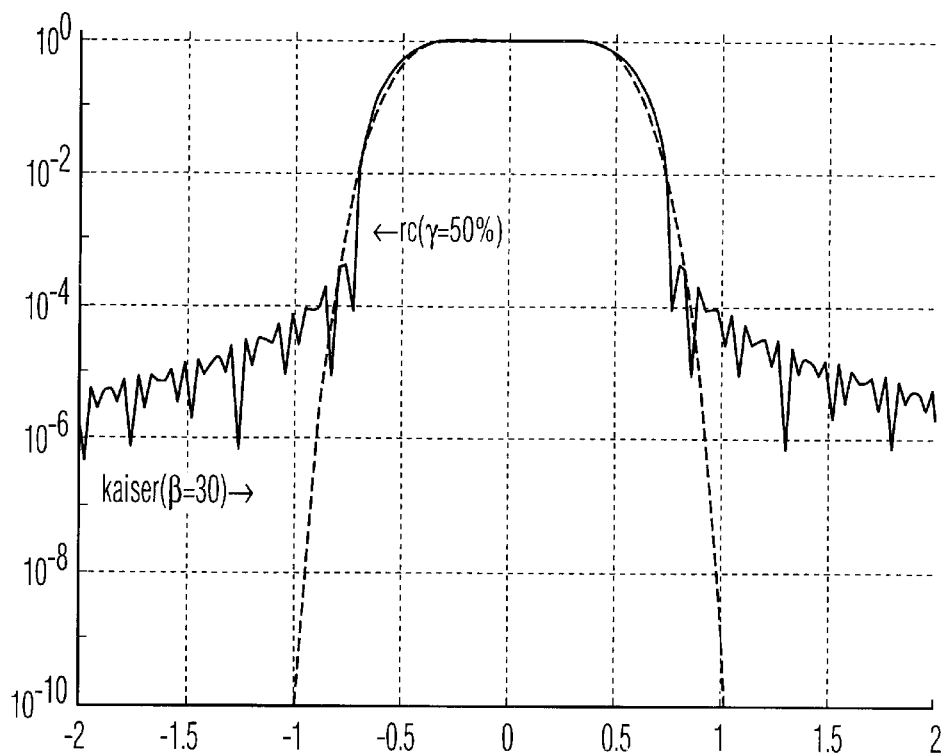

FIGS. 3a and 3b show a raised-cosine function with 50% excess bandwidth ($\gamma$=50%) in comparison with an otherwise very similar Kaiser windowed sinc function with $\beta$=30. In this case, the Kaiser windowed function is better for reducing aliasing distortion while raised-cosine function is better for reducing ringing distortion.

When performing image scaling, it is desirable to weight the input samples with appropriate values taken from the interpolation kernel. To avoid computation of the interpolator's coefficients in real time, it would be sufficient to store different sets of the coefficients in a read only memory (ROM) which can be addressed by a phase selector based on the phase (position lying between two input samples) of an output sample. It is however, desirable to compute sample values that have an arbitrary relationship to the input sample lattice. Thus, to define an ideal interpolator, an infinite number of filter coefficients and phases would be required. A practical solution is to have a large, but finite number of phases available. Therefore, the output sample lattice quantized to the nearest interpolation phase which allows the ROM lookup table to produce the corresponding set of coefficients. It has been shown in that a lookup table of 65 phases adds virtually no mean-square-error to the error that occurs due to image data roundoff.

Figure 4A:
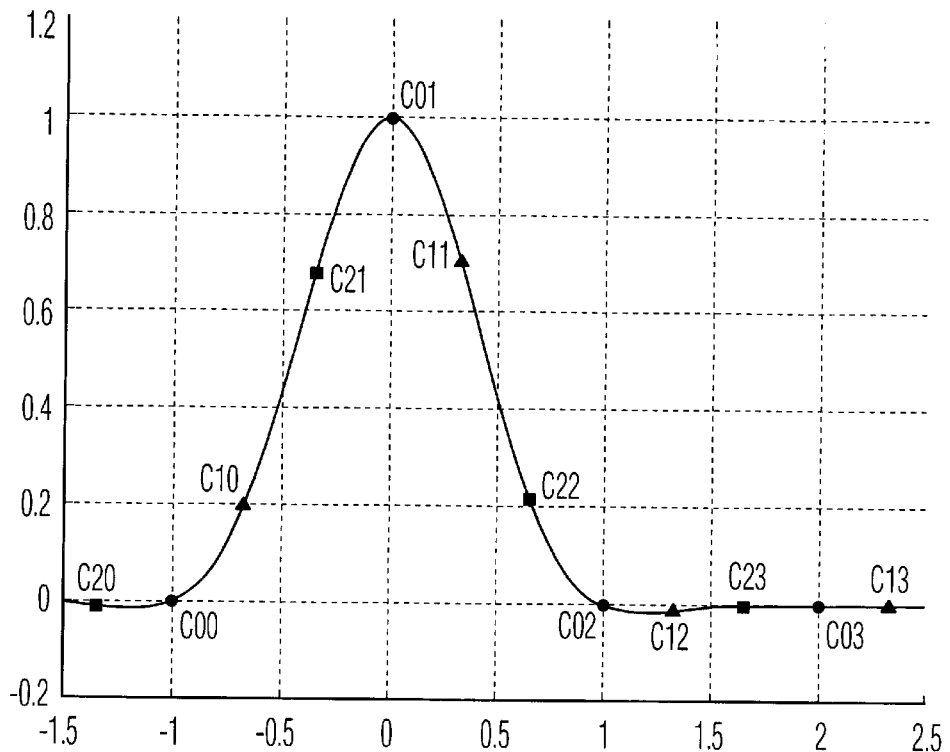
FIG. 4a is a graph of amplitude versus frequency, which shows an exemplary sampling of an analog waveform of an interpolation kernel, which defines a three-phase filter kernel.
Figure 4B:
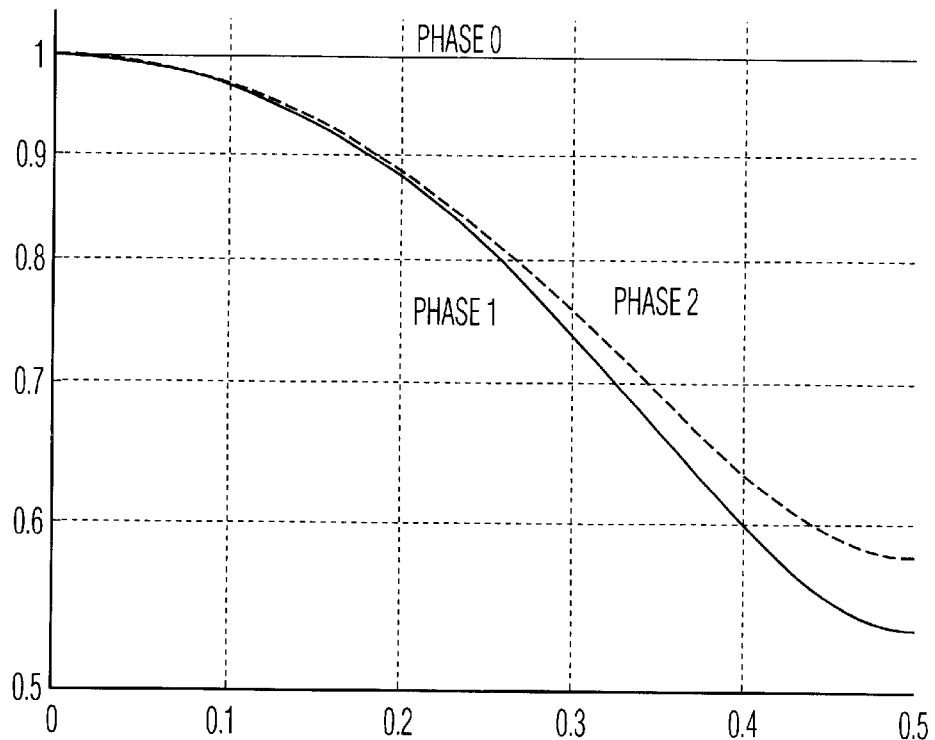

FIG. 4a shows an analog interpolator kernel with Kaiser windowed sine function which has been approximated by a 4-tap FIR filter with 3 phases. The 3 coefficient sets organized as dot, ($C_{00}$, $C_{01}$, $C_{02}$, and $C_{03}$), triangle ($C_{10}$, $C_{11}$ and $C_{12}$), and square ($C_{20}$, $C_{21}$ and $C_{22}$) shapes correspond to phase 0, 1 and 2, respectively. The frequency spectra after normalization are plotted in FIG. 4b.

Figure 5:
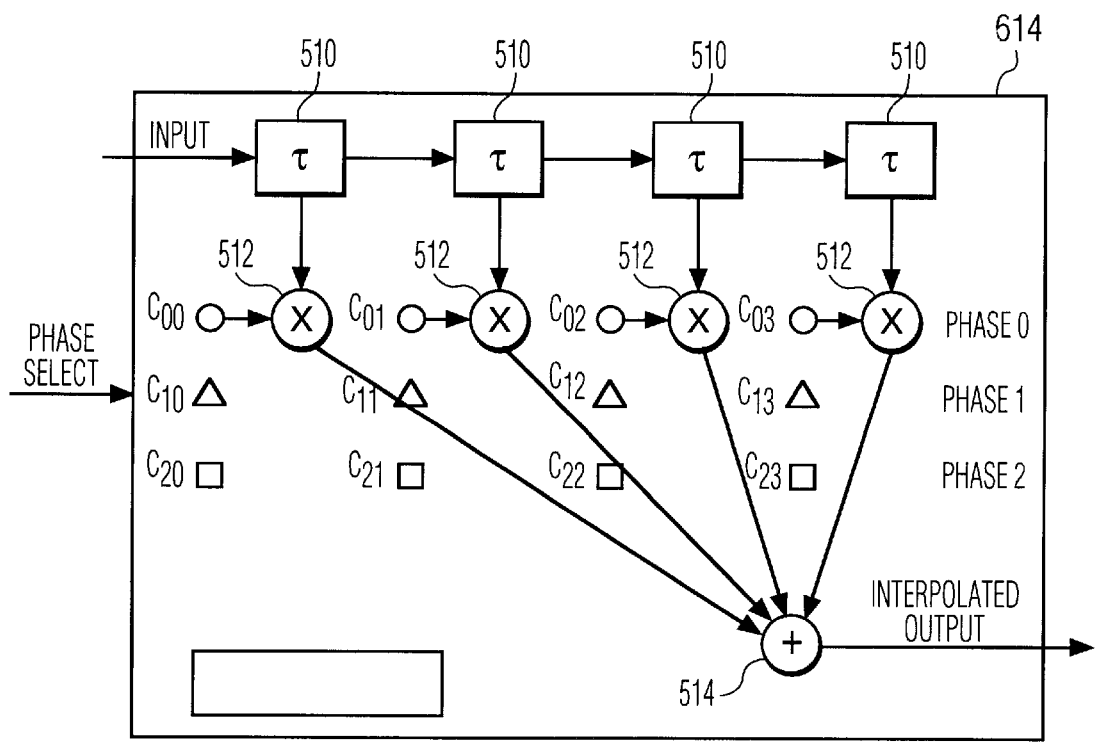
FIG. 5 (Prior Art) is an example of a one dimensional 4 tap finite impulse response interpolator with 3 phases.

One possible hardware realization of such an interpolator is shown in FIG. 5. The exemplary interpolator shown in FIG. 5 is a four-tap, three phase FIR filter. Input samples are provided to four series-connected delay elements 510. Each of the delay elements is coupled to a coefficient multiplier 512. Each of the multipliers 512 includes a coefficient look-up table memory (not shown) which holds three coefficients, one for each phase. A phase select signal is provided to the interpolator 614 to choose one coefficient set to be applied to one input port of each of the multipliers 512. The output signals of the multipliers 512 are summed by adder 514 to produce the output signal of the filter 614.

The interpolation filter shown in FIG. 5 is a four-tap, three phase FIR filter. As set forth below, the filter used in one exemplary embodiment of the invention is a 16-tap 128 phase filter. This filter may be implemented using a format conversion filter such as that disclosed in U.S. Pat. No. 5,057,911 entitled SYSTEM AND METHOD FOR CONVERSION OF DIGITAL VIDEO SIGNALS, which is incorporated herein by reference for its teachings on digital interpolation filters.

Figure 6:
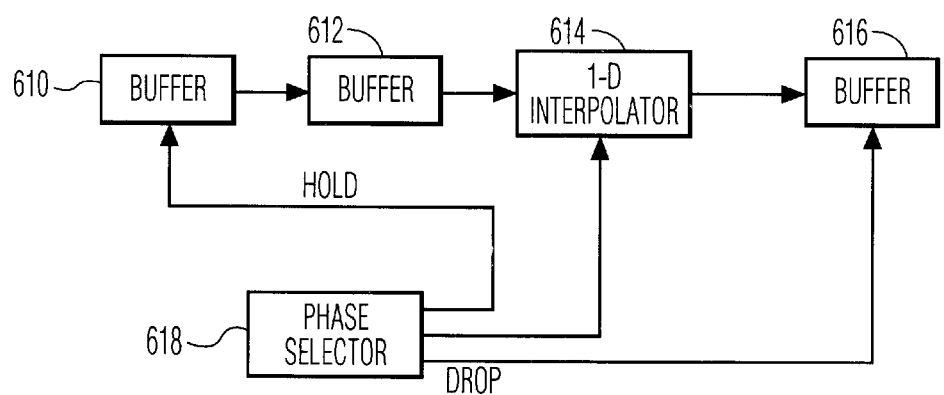
FIG. 6 (Prior Art) is an example of a 1-D image scaler architecture.

In general, a typical 1-D image scaler such as the one shown in FIG. 6, may consist of a front-end Buffer 610, which holds sample values when multiple output samples are formed from the same input samples. The lowpass filter (LPF) 612 is used as an anti-aliasing filter when downsampling. The 1-D interpolator 614 is described above with reference to FIG. 5. Buffer 616 is used to smooth out the output data during down-conversion. The DROP signal is asserted when there are no output samples between two input samples. No ouputs samples are written to Buffer 616 during this period.

The phase selector 618 provides the phase selection signal to the interpolator 614 and controls the fetching of input samples from the buffer 610 and the storing of output samples into the buffer 616. The phase sequence used for addressing the coefficient lookup tables in the interpolator 614 can be calculated via equation (8):

$$p_x = \left(x + \frac{A}{B} N_p\right) \text{mod}(N_p) \qquad (8)$$

where x is the current sample position, A and B are the output and input sample intervals, respectively; Np is the total number of phases.

Figure 7:
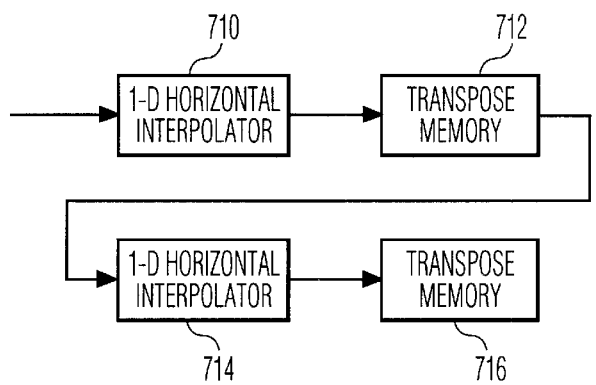
FIG. 7 (Prior Art) is an example of a 2-pass 1-D interpolation architecture which may be used for image scaling.

Although all the interpolation kernels discussed above can be generalized to the 2-D case, image interpolation based on a 2-D kernel is hardware intensive. Alternatively, 2-D interpolation can be acccomplish by performing 1-D interpolation in each dimension. As shown in FIG. 7, the horizontal scan lines are first processed using 1-D interpolator 710. The intermediate result is stored horizontally (i.e. line by line) in a transpose memory 712 and is then read out vertically (i.e. column by column) to be applied to second-pass interpolator which is identical to the first pass. The order of processing is arbitrary since the equivalent 2-D interpolation kernel is separable(e.g., h(x)h(y)).

As illustrated in Table 2, separable interpolation provides a substantial reduction in computational complexity from $O(n^2N^2)$ to $O(nN^2)$ for an N×N image and an n×n filter kernel.

TABLE 2

| Kernel Size (2-D/1-D) | Multiplications (2-D/1-D) | Address Calculation (2-D/1-D) |
| --- | --- | --- |
| 5 × 5/5(×2) | 25/10 | 24/8 |
| 6 × 6/6(×2) | 36/12 | 35/10 |
| ... | ... | ... |
| n × n/n(×2) | $n^2$/2n | $(n^2 - 1)/(2n - 1)$ |

The interpolation kernel plays a pivotal role in image scaling. A narrow transition region in the frequency domain is desirable because a sharp cut-off between the passband and the stopband minimizes blurring and aliasing. Unfortunately, the sharp transition also contributes to ringing artifacts. The ringing artifacts are particularly annoying when scaling CGI, such as video with a graphics overlay (e.g., movie credits) or text (e.g., a web page). The goal of reducing ringing artifacts and the goal of reducing blurring and aliasing are mutually incompatible.

Because it is difficult to design a single interpolator that provides solutions to the problems mentioned above, a better compromise may be achieved by using two interpolators. If the images scaled by the two interpolators are fused properly, the result will be a fused image with better overall performance than could be achieved by a single interpolator of comparable complexity.

As outlined above, a Kaiser windowed sinc function can be adjusted to have a narrow transition band that is desirable for minimizing aliasing distortion and blurring while a raised-cosine function can be made to have a smooth transition band that is desirable for minimizing ringing distortion. The desirable characteristics of these two filters may be fused using a heuristic. One exemplary heuristic is implemented in the apparatus shown in FIG. 8.

Figure 8:
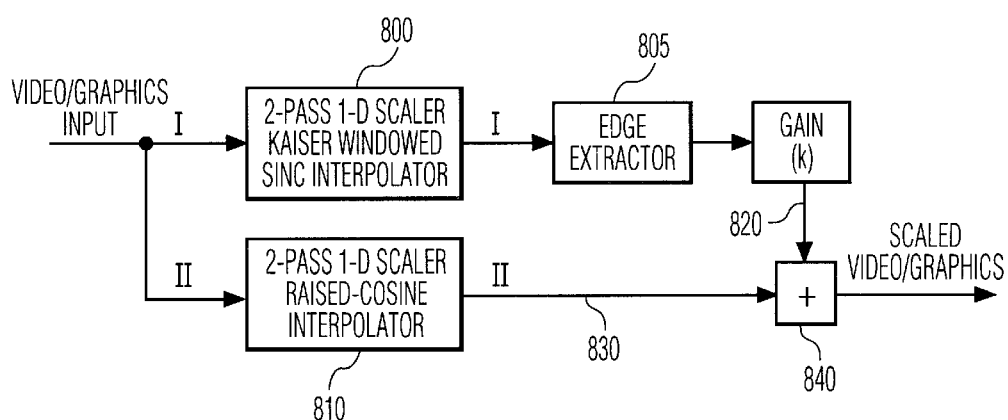
FIG. 8 is an example of a universal format conversion architecture according to the present invention.

FIG. 8 is a block diagram of a format conversion system according to the present invention. The interpolators residing in the two FCs are designed to have complementary characteristics so that better performance can be attained through image fusion.

FIG. 8 can also be used to describe the method for scaling an input image. The method may be implemented as a computer program, which may reside on a carrier such as a disk, diskette, or modulated carrier wave. When the exemplary method is implemented as a computer program, the input and output images may be stored in respective frame buffers and there would be no need for a separate transpose operation as the data may be stored into, and/or retrieved from the frame buffers either along a column or along a row. Furthermore, the two one-dimensional filters may be combined into a single two-dimensional filter in one or both of the interpolation operations.

Returning to FIG. 8, the input image is scaled in a first interpolator 800. In the exemplary embodiment of the invention, interpolator 800 is a 2-pass 1-D scaler which uses an interpolation kernel having a frequency response with a relatively sharp cut-off (such as a Kaiser-windowed sinc function with a small $\beta$) to generate a first intermediate scaled image.

The same input image that was processed by the scaler 800 is processed by the scaler 810, which may be, for example, a 2-pass 1-D scaler using an interpolation filter with more gradual roll-off in its transition band (such as a raised-cosine function with a moderate roll-off parameter $\gamma$), to generate a second intermediate scaled image.

A noise-insensitive edge extractor 805 (such as a 2-D 3×3 Marr filter) processes the first intermediate scaled image, provided by the interpolator 800 to separate the high-frequency component of the first intermediate scaled image.

The rationale for using an interpolator with a relatively sharp transition from its passband to its stopband to form the first intermediate scaled image is to reduce edge softening and aliasing without introducing excessive edge ringing. The 2-D Marr filter that forms the edge extractor 805 is essentially a high-pass filter which has been shown to be robust against spurious signals such as mild ringing. The high frequency output signals of the edge extractor 805 are scaled in amplitude by a gain block 820 to compensate the rolled-off edges provided by the interpolator 810. The resultant output of the step 820 is a ringing-reduced highpass signal of the scaled image and will be used to compensate the output signal provided by scaler 810. Although the gain block 820 is shown as a separate component of the format conversion system in FIG. 8, it is a contemplated that it may be implemented within the edge extractor 805 by an appropriate scaling of the coefficients used to implement the edge extractor.

The use of an interpolator 810 with smooth transition band is appropriate since it can suppress ringing artifacts to an indiscernible level. The penalty, however, is frequency response attenuation near the passband edge and aliasing. The attenuated frequencies can be largely compensated by the high frequency output signals of gain block 820, as stated above.

The summing circuit 840 adds the high-frequency components extracted by the edge extractor 805 and gain block 820 to produce the final scaled image. This image has the sharp edges provided by the Kaiser windowed sinc interpolator 800, edge extractor 805 and gain block 820 while having essentially no ringing artifacts due to the signal provided by the raised-cosine interpolator 810.

Tables 3, 4, and 5 respectively, show the filter information for a raised cosine response based interpolator ($\gamma$=50%), for a Kaiser-windowed sinc function interpolator ($\beta$=5) and for a 5×5 edge extractor for a gain of k=1. The exemplary interpolation filter has 128 phases, each phase has sixteen coefficients. Although this exemplary embodiment describes a filter having 128 phases, the inventors have determined that good results can also be attained using an interpolation filter with 65 phases, where each phase defines a distinct inter-sample position. Coefficients for such a filter may be obtained, for example by deleting the even-numbered phases as described below in Tables 3 and 4.

TABLE 3

Filter information for a Raised-cosine response based interpolator ($\gamma$ = 50%)

Phases 1 through 7

| | | | | | | |
|---|---|---|---|---|---|---|
| 0.0000 | 0.0000 | 0.0000 | 0.0000 | 0.0000 | 0.0000 | 0.0000 |
| 0.0000 | 0.0001 | 0.0001 | 0.0001 | 0.0002 | 0.0002 | 0.0002 |
| −0.0000 | −0.0000 | −0.0000 | −0.0000 | −0.0000 | −0.0000 | −0.0000 |
| −0.0001 | −0.0002 | −0.0003 | −0.0004 | −0.0006 | −0.0007 | −0.0008 |
| 0.0000 | 0.0000 | 0.0000 | 0.0000 | 0.0001 | 0.0001 | 0.0002 |
| 0.0006 | 0.0019 | 0.0031 | 0.0043 | 0.0055 | 0.0066 | 0.0077 |
| −0.0030 | −0.0090 | −0.0149 | −0.0206 | −0.0261 | −0.0316 | −0.0368 |
| 1.0000 | 0.9997 | 0.9992 | 0.9985 | 0.9976 | 0.9964 | 0.9951 |
| 0.0031 | 0.0094 | 0.0158 | 0.0223 | 0.0291 | 0.0359 | 0.0429 |
| −0.0007 | −0.0020 | −0.0034 | −0.0048 | −0.0062 | −0.0077 | −0.0092 |
| 0.0000 | 0.0000 | 0.0000 | 0.0001 | 0.0001 | 0.0001 | 0.0002 |
| 0.0001 | 0.0002 | 0.0003 | 0.0005 | 0.0006 | 0.0007 | 0.0009 |
| −0.0000 | −0.0000 | −0.0000 | −0.0000 | −0.0000 | −0.0000 | −0.0000 |
| −0.0000 | −0.0001 | −0.0001 | −0.0001 | −0.0002 | −0.0002 | −0.0002 |
| 0.0000 | 0.0000 | 0.0000 | 0.0000 | 0.0000 | 0.0000 | 0.0000 |
| 0.0000 | 0.0000 | 0.0000 | 0.0001 | 0.0001 | 0.0001 | 0.0001 |

Phases 8 through 14

| | | | | | | |
|---|---|---|---|---|---|---|
| 0.0000 | 0.0000 | 0.0000 | 0.0000 | 0.0000 | 0.0000 | 0.0000 |
| 0.0003 | 0.0003 | 0.0003 | 0.0004 | 0.0004 | 0.0004 | 0.0005 |
| −0.0000 | −0.0001 | −0.0001 | −0.0001 | −0.0001 | −0.0001 | −0.0001 |
| −0.0009 | −0.0010 | −0.0011 | −0.0013 | −0.0014 | −0.0015 | −0.0016 |
| 0.0002 | 0.0003 | 0.0003 | 0.0004 | 0.0005 | 0.0006 | 0.0006 |
| 0.0087 | 0.0097 | 0.0107 | 0.0116 | 0.0125 | 0.0133 | 0.0141 |
| −0.0419 | −0.0469 | −0.0517 | −0.0564 | −0.0609 | −0.0653 | −0.0695 |
| 0.9934 | 0.9916 | 0.9895 | 0.9872 | 0.9847 | 0.9820 | 0.9790 |
| 0.0500 | 0.0573 | 0.0646 | 0.0722 | 0.0798 | 0.0876 | 0.0955 |
| −0.0108 | −0.0124 | −0.0140 | −0.0157 | −0.0173 | −0.0191 | −0.0208 |
| 0.0002 | 0.0003 | 0.0004 | 0.0005 | 0.0006 | 0.0007 | 0.0008 |
| 0.0010 | 0.0012 | 0.0013 | 0.0014 | 0.0016 | 0.0017 | 0.0019 |
| −0.0000 | −0.0001 | −0.0001 | −0.0001 | −0.0001 | −0.0001 | −0.0002 |
| −0.0003 | −0.0003 | −0.0004 | −0.0004 | −0.0004 | −0.0005 | −0.0005 |
| 0.0000 | 0.0000 | 0.0000 | 0.0000 | 0.0000 | 0.0000 | 0.0001 |
| 0.0001 | 0.0001 | 0.0001 | 0.0002 | 0.0002 | 0.0002 | 0.0002 |

Phases 15 through 21

| | | | | | | |
|---|---|---|---|---|---|---|
| 0.0001 | 0.0001 | 0.0001 | 0.0001 | 0.0001 | 0.0001 | 0.0001 |
| 0.0005 | 0.0005 | 0.0005 | 0.0006 | 0.0006 | 0.0006 | 0.0007 |
| −0.0002 | −0.0002 | −0.0002 | −0.0002 | −0.0002 | −0.0003 | −0.0003 |
| −0.0017 | −0.0018 | −0.0019 | −0.0019 | −0.0020 | −0.0021 | −0.0022 |
| 0.0007 | 0.0008 | 0.0009 | 0.0010 | 0.0011 | 0.0012 | 0.0013 |

TABLE 3-continued

Filter information for a Raised-cosine response based interpolator
($\gamma = 50\%$)

| | | | | | | |
|---|---|---|---|---|---|---|
| 0.0149 | 0.0156 | 0.0163 | 0.0170 | 0.0176 | 0.0182 | 0.0188 |
| −0.0736 | −0.0776 | −0.0814 | −0.0850 | −0.0886 | −0.0919 | −0.0952 |
| 0.9758 | 0.9725 | 0.9688 | 0.9650 | 0.9610 | 0.9567 | 0.9523 |
| 0.1036 | 0.1117 | 0.1200 | 0.1284 | 0.1369 | 0.1456 | 0.1543 |
| −0.0226 | −0.0244 | −0.0262 | −0.0281 | −0.0300 | −0.0319 | −0.6339 |
| 0.0009 | 0.0011 | 0.0012 | 0.0014 | 0.0015 | 0.0017 | 0.0019 |
| 0.0020 | 0.0021 | 0.0023 | 0.0024 | 0.0025 | 0.0027 | 0.0028 |
| −0.0002 | −0.0002 | −0.0002 | −0.0003 | −0.0003 | −0.0003 | −0.0004 |
| −0.0006 | −0.0006 | −0.0006 | −0.0007 | −0.0007 | −0.0007 | −0.0008 |
| 0.0001 | 0.0001 | 0.0001 | 0.0001 | 0.0001 | 0.0001 | 0.0001 |
| 0.0002 | 0.0002 | 0.0003 | 0.0003 | 0.0003 | 0.0003 | 0.0003 |

Phases 22 through 28

| | | | | | | |
|---|---|---|---|---|---|---|
| 0.0001 | 0.0001 | 0.0001 | 0.0001 | 0.0002 | 0.0002 | 0.0002 |
| 0.0007 | 0.0007 | 0.0007 | 0.0007 | 0.0008 | 0.0008 | 0.0008 |
| −0.0003 | −0.0003 | −0.0004 | −0.0004 | −0.0004 | −0.0005 | −0.0005 |
| −0.0023 | −0.0023 | −0.0024 | −0.0025 | −0.0025 | −0.0026 | −0.0027 |
| 0.0015 | 0.0016 | 0.0017 | 0.0018 | 0.0019 | 0.0021 | 0.0022 |
| 0.0193 | 0.0198 | 0.0202 | 0.0206 | 0.0210 | 0.0214 | 0.0217 |
| −0.0982 | −0.1012 | −0.1040 | −0.1067 | −0.1092 | −0.1116 | −0.1139 |
| 0.9476 | 0.9427 | 0.9377 | 0.9324 | 0.9269 | 0.9213 | 0.9154 |
| 0.1632 | 0.1722 | 0.1813 | 0.1904 | 0.1997 | 0.2091 | 0.2186 |
| −0.0358 | −0.0378 | −0.0398 | −0.0419 | −0.0439 | −0.0460 | −0.0481 |
| 0.0021 | 0.0023 | 0.0025 | 0.0028 | 0.0030 | 0.0032 | 0.0035 |
| 0.0029 | 0.0031 | 0.0032 | 0.0033 | 0.0035 | 0.0036 | 0.0037 |
| −0.0004 | −0.0004 | −0.0005 | −0.0005 | −0.0005 | −0.0006 | −0.0006 |
| −0.0008 | −0.0008 | −0.0009 | −0.0009 | −0.0009 | −0.0010 | −0.0010 |
| 0.0001 | 0.0001 | 0.0002 | 0.0002 | 0.0002 | 0.0002 | 0.0002 |
| 0.0003 | 0.0003 | 0.0004 | 0.0004 | 0.0004 | 0.0004 | 0.0004 |

Phases 29 through 35

| | | | | | | |
|---|---|---|---|---|---|---|
| 0.0002 | 0.0002 | 0.0002 | 0.0002 | 0.0002 | 0.0002 | 0.0003 |
| 0.0008 | 0.0008 | 0.0009 | 0.0009 | 0.0009 | 0.0009 | 0.0009 |
| −0.0005 | −0.0005 | −0.0006 | −0.0006 | −0.0006 | −0.0007 | −0.0007 |
| −0.0027 | −0.0028 | −0.0028 | −0.0028 | −0.0029 | −0.0029 | −0.0030 |
| 0.0023 | 0.0024 | 0.0026 | 0.0027 | 0.0028 | 0.0030 | 0.0031 |
| 0.0220 | 0.0222 | 0.0225 | 0.0227 | 0.0228 | 0.0230 | 0.0231 |
| −0.1160 | −0.1180 | −0.1199 | −0.1216 | −0.1232 | −0.1247 | −0.1261 |
| 0.9094 | 0.9031 | 0.8967 | 0.8901 | 0.8833 | 0.8764 | 0.8693 |
| 0.2282 | 0.2378 | 0.2476 | 0.2574 | 0.2673 | 0.2773 | 0.2874 |
| −0.0501 | −0.0523 | −0.0544 | −0.0565 | −0.0587 | −0.0608 | −0.0630 |
| 0.0038 | 0.0040 | 0.0043 | 0.0046 | 0.0049 | 0.0052 | 0.0056 |
| 0.0038 | 0.0040 | 0.0041 | 0.0042 | 0.0043 | 0.0044 | 0.0045 |
| −0.0007 | −0.0007 | −0.0008 | −0.0008 | −0.0009 | −0.0009 | −0.0010 |
| −0.0010 | −0.0011 | −0.0011 | −0.0011 | −0.0011 | −0.0012 | −0.0012 |
| 0.0002 | 0.0002 | 0.0003 | 0.0003 | 0.0003 | 0.0003 | 0.0003 |
| 0.0004 | 0.0004 | 0.0004 | 0.0004 | 0.0005 | 0.0005 | 0.0005 |

Phases 36 through 42

| | | | | | | |
|---|---|---|---|---|---|---|
| 0.0003 | 0.0003 | 0.0003 | 0.0003 | 0.0003 | 0.0003 | 0.0003 |
| 0.0009 | 0.0009 | 0.0009 | 0.0009 | 0.0009 | 0.0010 | 0.0010 |
| −0.0007 | −0.0008 | −0.0008 | −0.0008 | −0.0008 | −0.0009 | −0.0009 |
| −0.0030 | −0.0030 | −0.0030 | −0.0031 | −0.0031 | −0.0031 | −0.0031 |
| 0.0032 | 0.0033 | 0.0035 | 0.0036 | 0.0037 | 0.0038 | 0.0040 |
| 0.0231 | 0.0232 | 0.0232 | 0.0232 | 0.0232 | 0.0232 | 0.0231 |
| −0.1273 | −0.1284 | −0.1294 | −0.1303 | −0.1311 | −0.1318 | −0.1323 |
| 0.8620 | 0.8545 | 0.8469 | 0.8391 | 0.8312 | 0.8231 | 0.8149 |
| 0.2975 | 0.3077 | 0.3180 | 0.3283 | 0.3387 | 0.3491 | 0.3596 |
| −0.0651 | −0.0673 | −0.0694 | −0.0716 | −0.0737 | −0.0759 | −0.0780 |
| 0.0059 | 0.0062 | 0.0066 | 0.0069 | 0.0073 | 0.0076 | 0.0080 |
| 0.0046 | 0.0047 | 0.0048 | 0.0049 | 0.0050 | 0.0051 | 0.0051 |
| −0.0010 | −0.0011 | −0.0011 | −0.0012 | −0.0012 | −0.0013 | −0.0014 |
| −0.0012 | −0.0012 | −0.0013 | −0.0013 | −0.0013 | −0.0013 | −0.0013 |
| 0.0003 | 0.0004 | 0.0004 | 0.0004 | 0.0004 | 0.0004 | 0.0005 |
| 0.0005 | 0.0005 | 0.0005 | 0.0005 | 0.0005 | 0.0005 | 0.0005 |

Phases 43 through 49

| | | | | | | |
|---|---|---|---|---|---|---|
| 0.0004 | 0.0004 | 0.0004 | 0.0004 | 0.0004 | 0.0004 | 0.0004 |
| 0.0010 | 0.0010 | 0.0010 | 0.0010 | 0.0010 | 0.9010 | 0.0010 |
| −0.0009 | −0.0010 | −0.0010 | −0.0010 | −0.0010 | −0.0011 | −0.0011 |
| −0.0031 | −0.0031 | −0.0031 | −0.0031 | −0.0031 | −0.0031 | −0.0031 |
| 0.0041 | 0.0042 | 0.0043 | 0.0044 | 0.0045 | 0.0046 | 0.0047 |
| 0.0230 | 0.0229 | 0.0228 | 0.0226 | 0.0225 | 0.0223 | 0.0221 |
| −0.1328 | −0.1331 | −0.1333 | −0.1334 | −0.1335 | −0.1334 | −0.1332 |
| 0.8066 | 0.7981 | 0.7894 | 0.7806 | 0.7717 | 0.7627 | 0.7536 |
| 0.3701 | 0.3807 | 0.3913 | 0.4019 | 0.4126 | 0.4233 | 0.4340 |

| | | | | | | |
|---|---|---|---|---|---|---|
| −0.0802 | −0.0823 | −0.0844 | −0.0865 | −0.0886 | −0.0906 | −0.0927 |
| 0.0084 | 0.0088 | 0.0092 | 0.0096 | 0.0100 | 0.0104 | 0.0108 |
| 0.0052 | 0.0053 | 0.0054 | 0.0054 | 0.0055 | 0.0055 | 0.0056 |
| −0.0014 | −0.0015 | −0.0015 | −0.0016 | −0.0016 | −0.0017 | −0.0018 |
| −0.0014 | −0.0014 | −0.0014 | −0.0014 | −0.0014 | −0.0014 | −0.0014 |
| 0.0005 | 0.0005 | 0.0005 | 0.0005 | 0.0005 | 0.0006 | 0.0006 |
| 0.0005 | 0.0005 | 0.0005 | 0.0006 | 0.0006 | 0.0006 | 0.0006 |

Phases 50 through 56

| | | | | | | |
|---|---|---|---|---|---|---|
| 0.0004 | 0.0004 | 0.0004 | 0.0005 | 0.0005 | 0.0005 | 0.0005 |
| 0.0010 | 0.0010 | 0.0010 | 0.0010 | 0.0009 | 0.0009 | 0.0009 |
| −0.0011 | −0.0012 | −0.0012 | −0.0012 | −0.0012 | −0.0012 | −0.0013 |
| −0.0031 | −0.0030 | −0.0030 | −0.0030 | −0.0030 | −0.0030 | −0.0029 |
| 0.0048 | 0.0049 | 0.0050 | 0.0051 | 0.0051 | 0.0052 | 0.0053 |
| 0.0218 | 0.0216 | 0.0213 | 0.0211 | 0.0208 | 0.0205 | 0.0202 |
| −0.1330 | −0.1326 | −0.1321 | −0.1316 | −0.1310 | −0.1303 | −0.1295 |
| 0.7443 | 0.7350 | 0.7255 | 0.7159 | 0.7062 | 0.6965 | 0.6866 |
| 0.4447 | 0.4555 | 0.4662 | 0.4770 | 0.4878 | 0.4985 | 0.5093 |
| −0.0947 | −0.0967 | −0.0986 | −0.1006 | −0.1025 | −0.1043 | −0.1062 |
| 0.0112 | 0.0116 | 0.0120 | 0.0124 | 0.0128 | 0.0132 | 0.0137 |
| 0.0056 | 0.0057 | 0.0057 | 0.0057 | 0.0057 | 0.0058 | 0.0058 |
| −0.0018 | −0.0019 | −0.0019 | −0.0020 | −0.0020 | −0.0021 | −0.0022 |
| −0.0014 | −0.0014 | −0.0014 | −0.0014 | −0.0014 | −0.0014 | −0.0014 |
| 0.0006 | 0.0006 | 0.0006 | 0.0007 | 0.0007 | 0.0007 | 0.0007 |
| 0.0006 | 0.0006 | 0.0006 | 0.0006 | 0.0006 | 0.0006 | 0.0006 |

Phases 57 through 63

| | | | | | | |
|---|---|---|---|---|---|---|
| 0.0005 | 0.0005 | 0.0005 | 0.0005 | 0.0005 | 0.0005 | 0.0005 |
| 0.0009 | 0.0009 | 0.0009 | 0.0009 | 0.0009 | 0.0009 | 0.0009 |
| −0.0013 | −0.0013 | −0.0013 | −0.0013 | −0.0014 | −0.0014 | −0.0014 |
| −0.0029 | −0.0029 | −0.0028 | −0.0028 | −0.0027 | −0.0027 | −0.0027 |
| 0.0054 | 0.0054 | 0.0055 | 0.0055 | 0.0056 | 0.0056 | 0.0057 |
| 0.0199 | 0.0195 | 0.0192 | 0.0188 | 0.0185 | 0.0181 | 0.0177 |
| −0.1287 | −0.1277 | −0.1267 | −0.1256 | −0.1245 | −0.1233 | −0.1220 |
| 0.6766 | 0.6666 | 0.6565 | 0.6463 | 0.6361 | 0.6258 | 0.6154 |
| 0.5200 | 0.5307 | 0.5414 | 0.5521 | 0.5627 | 0.5734 | 0.5839 |
| −0.1080 | −0.1097 | −0.1114 | −0.1131 | −0.1147 | −0.1163 | −0.1178 |
| 0.0141 | 0.0145 | 0.0149 | 0.0153 | 0.0157 | 0.0161 | 0.0165 |
| 0.0058 | 0.0058 | 0.0058 | 0.0058 | 0.0058 | 0.0058 | 0.0058 |
| −0.0022 | −0.0023 | −0.0023 | −0.0024 | −0.0024 | −0.0025 | −0.0025 |
| −0.0014 | −0.0014 | −0.0014 | −0.0014 | −0.0014 | −0.0014 | −0.0014 |
| 0.0007 | 0.0007 | 0.0008 | 0.0008 | 0.0008 | 0.0008 | 0.0008 |
| 0.0006 | 0.0006 | 0.0006 | 0.0006 | 0.0006 | 0.0006 | 0.0005 |

Phases 64 through 70

| | | | | | | |
|---|---|---|---|---|---|---|
| 0.0005 | 0.0005 | 0.0005 | 0.0006 | 0.0006 | 0.0006 | 0.0006 |
| 0.0008 | 0.0008 | 0.0008 | 0.0008 | 0.0008 | 0.0008 | 0.0008 |
| −0.0014 | −0.0014 | −0.0014 | −0.0014 | −0.0014 | −0.0014 | −0.0014 |
| −0.0026 | −0.0026 | −0.0025 | −0.0025 | −0.0024 | −0.0024 | −0.0023 |
| 0.0057 | 0.0057 | 0.0058 | 0.0058 | 0.0058 | 0.0058 | 0.0058 |
| 0.0173 | 0.0169 | 0.0165 | 0.0161 | 0.0157 | 0.0153 | 0.0149 |
| −0.1206 | −0.1192 | −0.1178 | −0.1163 | −0.1147 | −0.1131 | −0.1114 |
| 0.6049 | 0.5945 | 0.5839 | 0.5734 | 0.5627 | 0.5521 | 0.5414 |
| 0.5945 | 0.6049 | 0.6154 | 0.6258 | 0.6361 | 0.6463 | 0.6565 |
| −0.1192 | −0.1206 | −0.1220 | −0.1233 | −0.1245 | −0.1256 | −0.1267 |
| 0.0169 | 0.0173 | 0.0177 | 0.0181 | 0.0185 | 0.0188 | 0.0192 |
| 0.0057 | 0.0057 | 0.0057 | 0.0056 | 0.0056 | 0.0055 | 0.0055 |
| −0.0026 | −0.0026 | −0.0027 | −0.0027 | −0.0027 | −0.0028 | −0.0028 |
| −0.0014 | −0.0014 | −0.0014 | −0.0014 | −0.0014 | −0.0013 | −0.0013 |
| 0.0008 | 0.0008 | 0.0009 | 0.0009 | 0.0009 | 0.0009 | 0.0009 |
| 0.0005 | 0.0005 | 0.0005 | 0.0005 | 0.0005 | 0.0005 | 0.0005 |

Phases 71 through 77

| | | | | | | |
|---|---|---|---|---|---|---|
| 0.0006 | 0.0006 | 0.0006 | 0.0006 | 0.0006 | 0.0006 | 0.0006 |
| 0.0007 | 0.0007 | 0.0007 | 0.0007 | 0.0007 | 0.0007 | 0.0006 |
| −0.0014 | −0.0014 | −0.0014 | −0.0014 | −0.0014 | −0.0014 | −0.0014 |
| −0.0023 | −0.0022 | −0.0022 | −0.0021 | −0.0020 | −0.0020 | −0.0019 |
| 0.0058 | 0.0058 | 0.0058 | 0.0058 | 0.0057 | 0.0057 | 0.0057 |
| 0.0145 | 0.0141 | 0.0137 | 0.0132 | 0.0128 | 0.0124 | 0.0120 |
| −0.1097 | −0.1080 | −0.1062 | −0.1043 | −0.1025 | −0.1006 | −0.0986 |
| 0.5307 | 0.5200 | 0.5093 | 0.4985 | 0.4878 | 0.4770 | 0.4662 |
| 0.6666 | 0.6766 | 0.6866 | 0.6965 | 0.7062 | 0.7159 | 0.7255 |
| −0.1277 | −0.1287 | −0.1295 | −0.1303 | −0.1310 | −0.1316 | −0.1321 |
| 0.0195 | 0.0199 | 0.0202 | 0.0205 | 0.0208 | 0.0211 | 0.0213 |
| 0.0054 | 0.0054 | 0.0053 | 0.0052 | 0.0051 | 0.0051 | 0.0050 |
| −0.0029 | −0.0029 | −0.0029 | −0.0030 | −0.0030 | −0.0030 | −0.0030 |

TABLE 3-continued

Filter information for a Raised-cosine response based interpolator
(γ = 50%)

| | | | | | | |
|---|---|---|---|---|---|---|
| −0.0013 | −0.0013 | −0.0013 | −0.0012 | −0.0012 | −0.0012 | −0.0012 |
| 0.0009 | 0.0009 | 0.0009 | 0.0009 | 0.0009 | 0.0010 | 0.0010 |
| 0.0005 | 0.0005 | 0.0005 | 0.0005 | 0.0005 | 0.0005 | 0.0004 |

Phases 78 through 84

| | | | | | | |
|---|---|---|---|---|---|---|
| 0.0006 | 0.0006 | 0.0006 | 0.0006 | 0.6006 | 0.0006 | 0.0005 |
| 0.0006 | 0.0006 | 0.0006 | 0.0006 | 0.0005 | 0.0005 | 0.0005 |
| −0.0014 | −0.0014 | −0.0014 | −0.0014 | −0.0014 | −0.0014 | −0.0014 |
| −0.0019 | −0.0018 | −0.0018 | −0.0017 | −0.0016 | −0.0016 | −0.0015 |
| 0.0057 | 0.0056 | 0.0056 | 0.0055 | 0.0055 | 0.0054 | 0.0054 |
| 0.0116 | 0.0112 | 0.0108 | 0.0104 | 0.0100 | 0.0096 | 0.0092 |
| −0.0967 | −0.0947 | −0.0927 | −0.0906 | −0.0886 | −0.0865 | −0.0844 |
| 0.4555 | 0.4447 | 0.4340 | 0.4233 | 0.4126 | 0.4019 | 0.3913 |
| 0.7350 | 0.7443 | 0.7536 | 0.7627 | 0.7717 | 0.7806 | 0.7894 |
| −0.1326 | −0.1330 | −0.1332 | −0.1334 | −0.1335 | −0.1334 | −0.1333 |
| 0.0216 | 0.0218 | 0.0221 | 0.0223 | 0.0225 | 0.0226 | 0.0228 |
| 0.0049 | 0.0048 | 0.0047 | 0.0046 | 0.0045 | 0.0044 | 0.0043 |
| −0.0030 | −0.0031 | −0.0031 | −0.0031 | −0.0031 | −0.0031 | −0.0031 |
| −0.0012 | −0.0011 | −0.0011 | −0.0011 | −0.0010 | −0.0010 | −0.0010 |
| 0.0010 | 0.0010 | 0.0010 | 0.0010 | 0.0010 | 0.0010 | 0.0010 |
| 0.0004 | 0.0004 | 0.0004 | 0.0004 | 0.0004 | 0.0004 | 0.0004 |

Phases 85 through 91

| | | | | | | |
|---|---|---|---|---|---|---|
| 0.0005 | 0.0005 | 0.0005 | 0.0005 | 0.0005 | 0.0005 | 0.0005 |
| 0.0005 | 0.0005 | 0.0005 | 0.0004 | 0.0004 | 0.0004 | 0.0004 |
| −0.0014 | −0.0014 | −0.0013 | −0.0013 | −0.0013 | −0.0013 | −0.0013 |
| −0.0015 | −0.0014 | −0.0014 | −0.0013 | −0.0012 | −0.0012 | −0.0011 |
| 0.0053 | 0.0052 | 0.0051 | 0.0051 | 0.0050 | 0.0049 | 0.0048 |
| 0.0088 | 0.0084 | 0.0080 | 0.0076 | 0.0073 | 0.0069 | 0.0066 |
| −0.0823 | −0.0802 | −0.0780 | −0.0759 | −0.0737 | −0.0716 | −0.0694 |
| 0.3807 | 0.3701 | 0.3596 | 0.3491 | 0.3387 | 0.3283 | 0.3180 |
| 0.7981 | 0.8066 | 0.8149 | 0.8231 | 0.8312 | 0.8391 | 0.8469 |
| −0.1331 | −0.1328 | −0.1323 | −0.1318 | −0.1311 | −0.1303 | −0.1294 |
| 0.0229 | 0.0230 | 0.0231 | 0.0232 | 0.0232 | 0.0232 | 0.0232 |
| 0.0042 | 0.0041 | 0.0040 | 0.0038 | 0.0037 | 0.0036 | 0.0035 |
| −0.0031 | −0.0031 | −0.0031 | −0.0031 | −0.0031 | −0.0031 | −0.0030 |
| −0.0010 | −0.0009 | −0.0009 | −0.0009 | −0.0008 | −0.0008 | −0.0008 |
| 0.0010 | 0.0010 | 0.0010 | 0.0010 | 0.0009 | 0.0009 | 0.0009 |
| 0.0004 | 0.0004 | 0.0003 | 0.0003 | 0.0003 | 0.0003 | 0.0003 |

Phases 92 through 98

| | | | | | | |
|---|---|---|---|---|---|---|
| 0.0005 | 0.0005 | 0.0005 | 0.0005 | 0.0005 | 0.0004 | 0.0004 |
| 0.0004 | 0.0003 | 0.0003 | 0.0003 | 0.0003 | 0.0003 | 0.0003 |
| −0.0012 | −0.0012 | −0.0012 | −0.0012 | −0.0011 | −0.0011 | −0.0011 |
| −0.0011 | −0.0010 | −0.0010 | −0.0009 | −0.0009 | −0.0008 | −0.0008 |
| 0.0047 | 0.0046 | 0.0045 | 0.0044 | 0.0043 | 0.0042 | 0.0041 |
| 0.0062 | 0.0059 | 0.0056 | 0.0052 | 0.0049 | 0.0046 | 0.0043 |
| −0.0673 | −0.0651 | −0.0630 | −0.0608 | −0.0587 | −0.0565 | −0.0544 |
| 0.3077 | 0.2975 | 0.2874 | 0.2773 | 0.2673 | 0.2574 | 0.2476 |
| 0.8545 | 0.8620 | 0.8693 | 0.8764 | 0.8833 | 0.8901 | 0.8967 |
| −0.1284 | −0.1273 | −0.1261 | −0.1247 | −0.1232 | −0.1216 | −0.1199 |
| 0.0232 | 0.0231 | 0.0231 | 0.0230 | 0.0228 | 0.0227 | 0.0225 |
| 0.0033 | 0.0032 | 0.0031 | 0.0030 | 0.0028 | 0.0027 | 0.0026 |
| −0.0030 | −0.0030 | −0.0030 | −0.0029 | −0.0029 | −0.0028 | −0.0028 |
| −0.0008 | −0.0007 | −0.0007 | −0.0007 | −0.0006 | −0.0006 | −0.0006 |
| 0.0009 | 0.0009 | 0.0009 | 0.0009 | 0.0009 | 0.0009 | 0.0009 |
| 0.0003 | 0.0003 | 0.0003 | 0.0002 | 0.0002 | 0.0002 | 0.0002 |

Phases 99 through 105

| | | | | | | |
|---|---|---|---|---|---|---|
| 0.0004 | 0.0004 | 0.0004 | 0.0004 | 0.0004 | 0.0004 | 0.0004 |
| 0.0002 | 0.0002 | 0.0002 | 0.0002 | 0.0002 | 0.0002 | 0.0002 |
| −0.0011 | −0.0010 | −0.0010 | −0.0010 | −0.0009 | −0.0009 | −0.0009 |
| −0.0007 | −0.0007 | −0.0006 | −0.0006 | −0.0005 | −0.0005 | −0.0005 |
| 0.0040 | 0.0038 | 0.0037 | 0.0036 | 0.0035 | 0.0033 | 0.0032 |
| 0.0040 | 0.0038 | 0.0035 | 0.0032 | 0.0030 | 0.0028 | 0.0025 |
| −0.0523 | −0.0501 | −0.0481 | −0.0460 | −0.0439 | −0.0419 | −0.0398 |
| 0.2378 | 0.2282 | 0.2186 | 0.2091 | 0.1997 | 0.1904 | 0.1813 |
| 0.9031 | 0.9094 | 0.9154 | 0.9213 | 0.9269 | 0.9324 | 0.9377 |
| −0.1180 | −0.1160 | −0.1139 | −0.1116 | −0.1092 | −0.1067 | −0.1040 |
| 0.0222 | 0.0220 | 0.0217 | 0.0214 | 0.0210 | 0.0206 | 0.0202 |
| 0.0024 | 0.0023 | 0.0022 | 0.0021 | 0.0019 | 0.0018 | 0.0017 |
| −0.0028 | −0.0027 | −0.0027 | −0.0026 | −0.0025 | −0.0025 | −0.0024 |
| −0.0005 | −0.0005 | −0.0005 | −0.0005 | −0.0004 | −0.0004 | −0.0004 |
| 0.0008 | 0.0008 | 0.0008 | 0.0008 | 0.0008 | 0.0007 | 0.0007 |
| 0.0002 | 0.0002 | 0.0002 | 0.0002 | 0.0002 | 0.0001 | 0.0001 |

Phases 106 through 112

| | | | | | | |
|---|---|---|---|---|---|---|
| 0.0003 | 0.0003 | 0.0003 | 0.0003 | 0.0003 | 0.0003 | 0.0003 |
| 0.0001 | 0.0001 | 0.0001 | 0.0001 | 0.0001 | 0.0001 | 0.0001 |
| −0.0008 | −0.0008 | −0.0008 | −0.0007 | −0.0007 | −0.0007 | −0.0006 |
| −0.0004 | −0.0004 | −0.0004 | −0.0003 | −0.0003 | −0.0003 | −0.0002 |
| 0.0031 | 0.0029 | 0.0028 | 0.0027 | 0.0025 | 0.0024 | 0.0023 |
| 0.0023 | 0.0021 | 0.0019 | 0.0017 | 0.0015 | 0.0014 | 0.0012 |
| −0.0378 | −0.0358 | −0.0339 | −0.0319 | −0.0300 | −0.0281 | −0.0262 |
| 0.1722 | 0.1632 | 0.1543 | 0.1456 | 0.1369 | 0.1284 | 0.1200 |
| 0.9427 | 0.9476 | 0.9523 | 0.9567 | 0.9610 | 0.9650 | 0.9688 |
| −0.1012 | −0.0982 | −0.0952 | −0.0919 | −0.0886 | −0.0850 | −0.0814 |
| 0.0198 | 0.0193 | 0.0188 | 0.0182 | 0.0176 | 0.0170 | 0.0163 |
| 0.0016 | 0.0015 | 0.0013 | 0.0012 | 0.0011 | 0.0010 | 0.0009 |
| −0.0023 | −0.0023 | −0.0022 | −0.0021 | −0.0020 | −0.0019 | −0.0019 |
| −0.0003 | −0.0003 | −0.0003 | −0.0003 | −0.0002 | −0.0002 | −0.0002 |
| 0.0007 | 0.0007 | 0.0007 | 0.0006 | 0.0006 | 0.0006 | 0.0005 |
| 0.0001 | 0.0001 | 0.0001 | 0.0001 | 0.0001 | 0.0001 | 0.0001 |

Phases 113 through 119

| | | | | | | |
|---|---|---|---|---|---|---|
| 0.0002 | 0.0002 | 0.0002 | 0.0002 | 0.0002 | 0.0002 | 0.0001 |
| 0.0001 | 0.0001 | 0.0001 | 0.0000 | 0.0000 | 0.0000 | 0.0000 |
| −0.0006 | −0.0006 | −0.0005 | −0.0005 | −0.0004 | −0.0004 | −0.0004 |
| −0.0002 | −0.0002 | −0.0002 | −0.0001 | −0.0001 | −0.0001 | −0.0001 |
| 0.0021 | 0.0020 | 0.0019 | 0.0017 | 0.0016 | 0.0014 | 0.0013 |
| 0.0011 | 0.0009 | 0.0008 | 0.0007 | 0.0006 | 0.0005 | 0.0004 |
| −0.0244 | −0.0226 | −0.0208 | −0.0191 | −0.0173 | −0.0157 | −0.0140 |
| 0.1117 | 0.1036 | 0.0955 | 0.0876 | 0.0798 | 0.0722 | 0.0646 |
| 0.9725 | 0.9758 | 0.9790 | 0.9820 | 0.9847 | 0.9872 | 0.9895 |
| −0.0776 | −0.0736 | −0.0695 | −0.0653 | −0.0609 | −0.0564 | −0.0517 |
| 0.0156 | 0.0149 | 0.0141 | 0.0133 | 0.0125 | 0.0116 | 0.0107 |
| 0.0008 | 0.0007 | 0.0006 | 0.0006 | 0.0005 | 0.0004 | 0.0003 |
| −0.0018 | −0.0017 | −0.0016 | −0.0015 | −0.0014 | −0.0013 | −0.0001 |
| −0.0002 | −0.0002 | −0.0001 | −0.0001 | −0.0001 | −0.0001 | −0.0001 |
| 0.0005 | 0.0005 | 0.0005 | 0.0004 | 0.0004 | 0.0004 | 0.0003 |
| 0.0001 | 0.0001 | 0.0000 | 0.0000 | 0.0000 | 0.0000 | 0.0000 |

Phases 120 through 126

| | | | | | | |
|---|---|---|---|---|---|---|
| 0.0001 | 0.0001 | 0.0001 | 0.0001 | 0.0001 | 0.0001 | 0.0000 |
| 0.0000 | 0.0000 | 0.0000 | 0.0000 | 0.0000 | 0.0000 | 0.0000 |
| −0.0003 | −0.0003 | −0.0002 | −0.0002 | −0.0002 | −0.0001 | −0.0001 |
| −0.0001 | −0.0000 | 0.0000 | −0.9000 | −0.0000 | −0.0000 | −0.0000 |
| 0.0012 | 0.0010 | 0.0009 | 0.0007 | 0.0006 | 0.0005 | 0.0003 |
| 0.0003 | 0.0002 | 0.0002 | 0.0001 | 0.0001 | 0.0001 | 0.0000 |
| −0.0124 | −0.0108 | −0.0092 | −0.0077 | −0.0062 | −0.0048 | −0.0034 |
| 0.0573 | 0.0500 | 0.0429 | 0.0359 | 0.0291 | 0.0223 | 0.0158 |
| 0.9916 | 0.9934 | 0.9951 | 0.9964 | 0.9976 | 0.9985 | 0.9992 |
| −0.0469 | −0.0419 | −0.0368 | −0.0316 | −0.0261 | −0.0206 | −0.0149 |
| 0.0097 | 0.0087 | 0.0077 | 0.0066 | 0.0055 | 0.0043 | 0.0031 |
| 0.0003 | 0.0002 | 0.0002 | 0.0001 | 0.0001 | 0.0000 | 0.0000 |
| −0.0010 | −0.0009 | −0.0008 | −0.0007 | −0.0006 | −0.0004 | −0.0003 |
| −0.0001 | −0.0000 | −0.0000 | −0.0000 | −0.0000 | −0.0000 | −0.0000 |
| 0.0003 | 0.0003 | 0.0002 | 0.0002 | 0.0002 | 0.0001 | 0.0001 |
| 0.0000 | 0.0000 | 0.0000 | 0.0000 | 0.0000 | 0.0000 | 0.0000 |

Phases 127 through 128

| | |
|---|---|
| 0.0000 | 0.0000 |
| 0.0000 | 0.0000 |
| −0.0001 | −0.0000 |
| −0.0000 | −0.0000 |
| 0.0002 | 0.0001 |
| 0.0000 | 0.0000 |
| −0.0020 | −0.0007 |
| 0.0094 | 0.0031 |
| 0.9997 | 1.0000 |
| −0.0090 | −0.0030 |
| 0.0019 | 0.0006 |
| 0.0000 | 0.0000 |
| −0.0002 | −0.0001 |
| −0.0000 | −0.0000 |
| 0.0001 | 0.0000 |
| 0.0000 | 0.0000 |

TABLE 4

Filter information for a Kaiser-window based interpolator (γ = 5)

Phases 1 through 7

| | | | | | | |
|---|---|---|---|---|---|---|
| −0.0001 | −0.0003 | −0.0006 | −0.0008 | −0.0010 | −0.0012 | −0.0014 |
| 0.0002 | 0.0006 | 0.0011 | 0.0015 | 0.0019 | 0.0023 | 0.0027 |
| −0.0004 | −0.0011 | −0.0018 | −0.0026 | −0.0033 | −0.0040 | −0.0047 |
| 0.0006 | 0.0018 | 0.0030 | 0.0042 | 0.0054 | 0.6066 | 0.0078 |
| −0.0010 | −0.0030 | −0.0050 | −0.0070 | −0.0089 | −0.0108 | −0.0127 |
| 0.0017 | 0.0052 | 0.0086 | 0.0120 | 0.0154 | 0.0187 | 0.0219 |
| −0.0038 | −0.0113 | −0.0186 | −0.0258 | −0.0329 | −0.0399 | −0.0467 |
| 1.0000 | 0.9999 | 0.9996 | 0.9991 | 0.9984 | 0.9975 | 0.9963 |
| 0.0038 | 0.0115 | 0.0194 | 0.0274 | 0.0355 | 0.0437 | 0.0520 |
| −0.0018 | −0.0053 | −0.0088 | −0.0124 | −0.0160 | −0.0197 | −0.0233 |
| 0.0010 | 0.0030 | 0.0051 | 0.0072 | 0.0092 | 0.0113 | 0.0134 |
| −0.0006 | −0.0019 | −0.0031 | −0.0044 | −0.0056 | −0.0069 | −0.0082 |
| 0.0004 | 0.0011 | 0.0019 | 0.0026 | 0.0034 | 0.0042 | 0.0049 |
| −0.0002 | −0.0006 | −0.0011 | −0.0015 | −0.0020 | −0.0024 | −0.0028 |
| 0.0001 | 0.0003 | 0.0006 | 0.0008 | 0.0010 | 0.0013 | 0.0015 |
| −0.0001 | −0.0002 | −0.0003 | −0.0004 | −0.0005 | −0.0006 | −0.0007 |

Phases 8 through 14

| | | | | | | |
|---|---|---|---|---|---|---|
| −0.0016 | −0.0018 | −0.0020 | −0.0022 | −0.0024 | −0.0026 | −0.0028 |
| 0.0031 | 0.0035 | 0.0038 | 0.0042 | 0.0046 | 0.0050 | 0.0053 |
| −0.0054 | −0.0061 | −0.0067 | −0.0074 | −0.0080 | −0.0087 | −0.0093 |
| 0.0089 | 0.0101 | 0.0112 | 0.0123 | 0.0134 | 0.0144 | 0.0155 |
| −0.0146 | −0.0165 | −0.0183 | −0.0201 | −0.0219 | −0.0237 | −0.0254 |
| 0.0252 | 0.0283 | 0.0315 | 0.0346 | 0.0376 | 0.0406 | 0.0435 |
| −0.0534 | −0.0600 | −0.0664 | −0.0727 | −0.0788 | −0.0848 | −0.0907 |
| 0.9950 | 0.9935 | 0.9917 | 0.9898 | 0.9877 | 0.9853 | 0.9828 |
| 0.0604 | 0.0690 | 0.0777 | 0.0864 | 0.0953 | 0.1043 | 0.1134 |
| −0.0270 | −0.0307 | −0.0345 | −0.0382 | −0.0420 | −0.0457 | −0.0495 |
| 0.0155 | 0.0176 | 0.0198 | 0.0219 | 0.0240 | 0.0261 | 0.0283 |
| −0.0094 | −0.0107 | −0.0120 | −0.0133 | −0.0146 | −0.0159 | −0.0172 |
| 0.0057 | 0.0065 | 0.0073 | 0.0081 | 0.0088 | 0.0096 | 0.0104 |
| −0.0033 | −0.0037 | −0.0042 | −0.0047 | −0.0051 | −0.0056 | −0.0060 |
| 0.0017 | 0.0020 | 0.0022 | 0.0025 | 0.0027 | 0.0030 | 0.0032 |
| −0.0008 | −0.0009 | −0.0010 | −0.0011 | −0.0012 | −0.0014 | −0.0015 |

Phases 15 through 21

| | | | | | | |
|---|---|---|---|---|---|---|
| −0.0029 | −0.0031 | −0.0033 | −0.0035 | −0.0036 | −0.0038 | −0.0039 |
| 0.0057 | 0.0060 | 0.0064 | 0.0067 | 0.0070 | 0.0073 | 0.0076 |
| −0.0099 | −0.0106 | −0.0112 | −0.0117 | −0.0123 | −0.0129 | −0.0134 |
| 0.0165 | 0.0176 | 0.0186 | 0.0195 | 0.0205 | 0.0214 | 0.0224 |
| −0.0271 | −0.0288 | −0.0304 | −0.0320 | −0.0336 | −0.0351 | −0.0367 |
| 0.0464 | 0.0492 | 0.0520 | 0.0547 | 0.0574 | 0.0599 | 0.0625 |
| −0.0964 | −0.1020 | −0.1074 | −0.1127 | −0.1178 | −0.1228 | −0.1277 |
| 0.9800 | 0.9771 | 0.9740 | 0.9706 | 0.9671 | 0.9634 | 0.9595 |
| 0.1226 | 0.1318 | 0.1412 | 0.1507 | 0.1602 | 0.1698 | 0.1796 |
| −0.0533 | −0.0571 | −0.0609 | −0.0647 | −0.0685 | −0.0723 | −0.0761 |
| 0.0304 | 0.0325 | 0.0347 | 0.0368 | 0.0389 | 0.0410 | 0.0431 |
| −0.0185 | −0.0198 | −0.0211 | −0.0224 | −0.0236 | −0.0249 | −0.0262 |
| 0.0112 | 0.0120 | 0.0128 | 0.0135 | 0.0143 | 0.0151 | 0.0159 |
| −0.0065 | −0.0069 | −0.0074 | −0.0079 | −0.0083 | −0.0088 | −0.0092 |
| 0.0035 | 0.0037 | 0.0039 | 0.0042 | 0.0044 | 0.0047 | 0.0049 |
| −0.0016 | −0.0017 | −0.0018 | −0.0019 | −0.0020 | −0.0022 | −0.0023 |

Phases 22 through 28

| | | | | | | |
|---|---|---|---|---|---|---|
| −0.0041 | −0.0042 | −0.0044 | −0.0045 | −0.0046 | −0.0048 | −0.0049 |
| 0.0079 | 0.0082 | 0.0085 | 0.0088 | 0.0091 | 0.0093 | 0.0096 |
| −0.0140 | −0.0145 | −0.0150 | −0.0155 | −0.0160 | −0.0165 | −0.0169 |
| 0.0233 | 0.0242 | 0.0250 | 0.0259 | 0.0267 | 0.0275 | 0.0282 |
| −0.0381 | −0.0396 | −0.0410 | −0.0423 | −0.0437 | −0.0450 | −0.0462 |
| 0.0650 | 0.0674 | 0.0697 | 0.0720 | 0.0742 | 0.0764 | 0.0785 |
| −0.1324 | −0.1370 | −0.1414 | −0.1456 | −0.1498 | −0.1537 | −0.1575 |
| 0.9554 | 0.9511 | 0.9466 | 0.9420 | 0.9371 | 0.9321 | 0.9269 |
| 0.1894 | 0.1992 | 0.2092 | 0.2192 | 0.2293 | 0.2394 | 0.2497 |
| −0.0798 | −0.0836 | −0.0874 | −0.0911 | −0.0948 | −0.0985 | −0.1022 |
| 0.0452 | 0.0473 | 0.0494 | 0.0514 | 0.0535 | 0.0555 | 0.0575 |
| −0.0275 | −0.0287 | −0.0300 | −0.0312 | −0.0325 | −0.0337 | −0.0349 |
| 0.0167 | 0.0174 | 0.0182 | 0.0189 | 0.0197 | 0.0204 | 0.0212 |
| −0.0097 | −0.0101 | −0.0106 | −0.0110 | −0.0115 | −0.0119 | −0.0123 |
| 0.0052 | 0.0054 | 0.0057 | 0.0059 | 0.0062 | 0.0064 | 0.0066 |
| −0.0024 | −0.0025 | −0.0026 | −0.0028 | −0.0029 | −0.0030 | −0.0031 |

Phases 29 through 35

| | | | | | | |
|---|---|---|---|---|---|---|
| −0.0050 | −0.0051 | −0.0052 | −0.0054 | −0.0055 | −0.0055 | −0.0056 |
| 0.0098 | 0.0101 | 0.0103 | 0.0105 | 0.0107 | 0.0109 | 0.0111 |
| −0.0174 | −0.0178 | −0.0182 | −0.0186 | −0.0190 | −0.0193 | −0.0197 |
| 0.0290 | 0.0297 | 0.0304 | 0.0311 | 0.0317 | 0.0324 | 0.0330 |
| −0.0475 | −0.0486 | −0.0498 | −0.0509 | −0.0520 | −0.0530 | −0.0540 |
| 0.0805 | 0.0825 | 0.0844 | 0.0862 | 0.0879 | 0.0896 | 0.0912 |
| −0.1612 | −0.1647 | −0.1681 | −0.1713 | −0.1744 | −0.1774 | −0.1801 |
| 0.9215 | 0.9159 | 0.9102 | 0.9043 | 0.8982 | 0.8919 | 0.8855 |
| 0.2599 | 0.2703 | 0.2806 | 0.2911 | 0.3015 | 0.3120 | 0.3226 |
| −0.1059 | −0.1095 | −0.1131 | −0.1167 | −0.1202 | −0.1237 | −0.1272 |
| 0.0595 | 0.0615 | 0.0634 | 0.0654 | 0.0673 | 0.0691 | 0.0710 |
| −0.0361 | −0.0373 | −0.0385 | −0.0396 | −0.0408 | −0.0419 | −0.0430 |
| 0.0219 | 0.0226 | 0.0234 | 0.0241 | 0.0248 | 0.0254 | 0.0261 |
| −0.0128 | −0.0132 | −0.0136 | −0.0140 | −0.0145 | −0.0149 | −0.0153 |
| 0.0069 | 0.0071 | 0.0073 | 0.0076 | 0.0078 | 0.0080 | 0.0083 |
| −0.0032 | −0.0033 | −0.0035 | −0.0036 | −0.0037 | −0.0038 | −0.0039 |

Phases 36 through 42

| | | | | | | |
|---|---|---|---|---|---|---|
| −0.0057 | −0.0058 | −0.0059 | −0.0060 | −0.0060 | −0.0061 | −0.0062 |
| 0.0113 | 0.0115 | 0.0116 | 0.0118 | 0.0119 | 0.0121 | 0.0122 |
| −0.0200 | −0.0204 | −0.0207 | −0.0210 | −0.0212 | −0.0215 | −0.0217 |
| 0.0335 | 0.0341 | 0.0346 | 0.0351 | 0.0356 | 0.0360 | 0.0365 |
| −0.0549 | −0.0558 | −0.0567 | −0.0575 | −0.0583 | −0.0590 | −0.0597 |
| 0.0928 | 0.0942 | 0.0956 | 0.0970 | 0.0982 | 0.0994 | 0.1006 |
| −0.1828 | −0.1853 | −0.1876 | −0.1898 | −0.1919 | −0.1938 | −0.1956 |
| 0.8789 | 0.8722 | 0.8653 | 0.8582 | 0.8510 | 0.8437 | 0.8362 |
| 0.3332 | 0.3438 | 0.3545 | 0.3651 | 0.3758 | 0.3866 | 0.3973 |
| −0.1306 | −0.1339 | −0.1373 | −0.1405 | −0.1438 | −0.1469 | −0.1501 |
| 0.0728 | 0.0746 | 0.0764 | 0.0781 | 0.0798 | 0.0814 | 0.0831 |
| −0.0441 | −0.0452 | −0.0462 | −0.0472 | −0.0482 | −0.0492 | −0.0502 |
| 0.0268 | 0.0275 | 0.0281 | 0.0287 | 0.0293 | 0.0300 | 0.0305 |
| −0.0157 | −0.0161 | −0.0164 | −0.0168 | −0.0172 | −0.0176 | −0.0179 |
| 0.0085 | 0.0087 | 0.0089 | 0.0091 | 0.0093 | 0.0095 | 0.0097 |
| −0.0040 | −0.0041 | −0.0042 | −0.0043 | −0.0044 | −0.0045 | −0.0046 |

Phases 43 through 49

| | | | | | | |
|---|---|---|---|---|---|---|
| −0.0062 | −0.0063 | −0.0063 | −0.0063 | −0.0064 | −0.0064 | −0.0064 |
| 0.0123 | 0.0124 | 0.0125 | 0.0126 | 0.0127 | 0.0128 | 0.0129 |
| −0.0220 | −0.0222 | −0.0224 | −0.0226 | −0.0227 | −0.0229 | −0.0230 |
| 0.0369 | 0.0372 | 0.0376 | 0.0379 | 0.0382 | 0.0385 | 0.0387 |
| −0.0604 | −0.0610 | −0.0615 | −0.0621 | −0.0626 | −0.0630 | −0.0634 |
| 0.1016 | 0.1026 | 0.1035 | 0.1043 | 0.1051 | 0.1058 | 0.1064 |
| −0.1972 | −0.1987 | −0.2000 | −0.2012 | −0.2023 | −0.2033 | −0.2041 |
| 0.8285 | 0.8207 | 0.8128 | 0.8047 | 0.7965 | 0.7882 | 0.7797 |
| 0.4080 | 0.4188 | 0.4295 | 0.4403 | 0.4510 | 0.4618 | 0.4725 |
| −0.1531 | −0.1561 | −0.1590 | −0.1619 | −0.1647 | −0.1674 | −0.1701 |
| 0.0846 | 0.0862 | 0.0877 | 0.0892 | 0.0906 | 0.0919 | 0.0933 |
| −0.0511 | −0.0521 | −0.0530 | −0.0538 | −0.0547 | −0.0555 | −0.0563 |
| 0.0311 | 0.0317 | 0.0322 | 0.0328 | 0.0333 | 0.0338 | 0.0343 |
| −0.0183 | −0.0186 | −0.0189 | −0.0192 | −0.0196 | −0.0199 | −0.0202 |
| 0.0099 | 0.0101 | 0.0103 | 0.0105 | 0.0107 | 0.0109 | 0.0110 |
| −0.0047 | −0.0048 | −0.0049 | −0.0050 | −0.0051 | −0.0052 | −0.0053 |

Phases 50 through 56

| | | | | | | |
|---|---|---|---|---|---|---|
| −0.0065 | −0.0065 | −0.0065 | −0.0065 | −0.0065 | −0.0065 | −0.0065 |
| 0.0129 | 0.0130 | 0.0130 | 0.0131 | 0.0131 | 0.0131 | 0.0131 |
| −0.0232 | −0.0233 | −0.0234 | −0.0234 | −0.0235 | −0.0235 | −0.0236 |
| 0.0389 | 0.0391 | 0.0393 | 0.0394 | 0.0395 | 0.0396 | 0.0397 |
| −0.0638 | −0.0641 | −0.0643 | −0.0646 | −0.0648 | −0.0649 | −0.0650 |
| 0.1069 | 0.1074 | 0.1078 | 0.1082 | 0.1084 | 0.1086 | 0.1088 |
| −0.2047 | −0.2052 | −0.2056 | −0.2059 | −0.2061 | −0.2061 | −0.2059 |
| 0.7711 | 0.7624 | 0.7536 | 0.7446 | 0.7356 | 0.7264 | 0.7172 |
| 0.4832 | 0.4939 | 0.5046 | 0.5152 | 0.5259 | 0.5364 | 0.5470 |
| −0.1727 | −0.1752 | −0.1776 | −0.1799 | −0.1822 | −0.1843 | −0.1864 |
| 0.0946 | 0.0958 | 0.0970 | 0.0981 | 0.0992 | 0.1002 | 0.1012 |
| −0.0570 | −0.0577 | −0.0584 | −0.0591 | −0.0597 | −0.0603 | −0.0609 |
| 0.0347 | 0.0352 | 0.0356 | 0.0360 | 0.0364 | 0.0368 | 0.0371 |
| −0.0204 | −0.0207 | −0.0210 | −0.0212 | −0.0215 | −0.0217 | −0.0219 |
| 0.0112 | 0.0113 | 0.0115 | 0.0116 | 0.0118 | 0.0119 | 0.0120 |
| −0.0054 | −0.0055 | −0.0056 | −0.0056 | −0.0057 | −0.0058 | −0.0058 |

Phases 57 through 63

| | | | | | | |
|---|---|---|---|---|---|---|
| −0.0065 | −0.0065 | −0.0065 | −0.0064 | −0.0064 | −0.0064 | −0.0064 |
| 0.0131 | 0.0131 | 0.0131 | 0.0131 | 0.0130 | 0.0130 | 0.0129 |
| −0.0236 | −0.0236 | −0.0236 | −0.0235 | −0.0235 | −0.0234 | −0.0234 |
| 0.0397 | 0.0397 | 0.0397 | 0.0397 | 0.0396 | 0.0395 | 0.0394 |
| −0.0651 | −0.0651 | −0.0651 | −0.0651 | −0.0650 | −0.0648 | −0.0647 |
| 0.1088 | 0.1088 | 0.1088 | 0.1086 | 0.1084 | 0.1082 | 0.1079 |
| −0.2057 | −0.2053 | −0.2049 | −0.2043 | −0.2035 | −0.2027 | −0.2018 |
| 0.7078 | 0.6983 | 0.6888 | 0.6791 | 0.6694 | 0.6596 | 0.6497 |

TABLE 4-continued

Filter information for a Kaiser-window based interpolator (γ = 5)

| | | | | | | |
|---|---|---|---|---|---|---|
| 0.5575 | 0.5680 | 0.5784 | 0.5888 | 0.5991 | 0.6093 | 0.6195 |
| −0.1884 | −0.1903 | −0.1921 | −0.1938 | −0.1954 | −0.1968 | −0.1982 |
| 0.1021 | 0.1030 | 0.1038 | 0.1046 | 0.1053 | 0.1059 | 0.1965 |
| −0.0614 | −0.0619 | −0.0624 | −0.0628 | −0.0632 | −0.0636 | −0.0639 |
| 0.0374 | 0.0378 | 0.0380 | 0.0383 | 0.0386 | 0.0388 | 0.0390 |
| −0.0221 | −0.0223 | −0.0225 | −0.0226 | −0.0228 | −0.0229 | −0.0231 |
| 0.0122 | 0.0123 | 0.0124 | 0.0125 | 0.0126 | 0.0127 | 0.0127 |
| −0.0059 | −0.0060 | −0.0060 | −0.0061 | −0.0061 | −0.0062 | −0.0062 |

Phases 64 through 70

| | | | | | | |
|---|---|---|---|---|---|---|
| −0.0063 | −0.0063 | −0.0062 | −0.0062 | −0.0061 | −0.0061 | −0.0060 |
| 0.0129 | 0.0128 | 0.0127 | 0.0127 | 0.0126 | 0.0125 | 0.0124 |
| −0.0233 | −0.0232 | −0.0231 | −0.0229 | −0.0228 | −0.0226 | −0.0225 |
| 0.0393 | 0.0392 | 0.0390 | 0.0388 | 0.0386 | 0.0383 | 0.0380 |
| −0.0645 | −0.0642 | −0.0639 | −0.0636 | −0.0632 | −0.0628 | −0.0624 |
| 0.1075 | 0.1070 | 0.1065 | 0.1059 | 0.1053 | 0.1046 | 0.1038 |
| −0.2007 | −0.1995 | −0.1982 | −0.1968 | −0.1954 | −0.1938 | −0.1921 |
| 0.6397 | 0.6296 | 0.6195 | 0.6093 | 0.5991 | 0.5888 | 0.5784 |
| 0.6296 | 0.6397 | 0.6497 | 0.6596 | 0.6694 | 0.6791 | 0.6888 |
| −0.1995 | −0.2007 | −0.2018 | −0.2027 | −0.2035 | −0.2043 | −0.2049 |
| 0.1070 | 0.1075 | 0.1079 | 0.1082 | 0.1084 | 0.1086 | 0.1088 |
| −0.0642 | −0.0645 | −0.0647 | −0.0648 | −0.0650 | −0.0651 | −0.0651 |
| 0.0392 | 0.0393 | 0.0394 | 0.0395 | 0.0396 | 0.0397 | 0.0397 |
| −0.0232 | −0.0233 | −0.0234 | −0.0234 | −0.0235 | −0.0235 | −0.0236 |
| 0.0128 | 0.0129 | 0.0129 | 0.0130 | 0.0130 | 0.0131 | 0.0131 |
| −0.0063 | −0.0063 | −0.0064 | −0.0064 | −0.0064 | −0.0064 | −0.0065 |

Phases 71 through 77

| | | | | | | |
|---|---|---|---|---|---|---|
| −0.0060 | −0.0059 | −0.0058 | −0.0058 | −0.0057 | −0.0056 | −0.0056 |
| 0.0123 | 0.0122 | 0.0120 | 0.0119 | 0.0118 | 0.0116 | 0.0115 |
| −0.0223 | −0.0221 | −0.0219 | −0.0217 | −0.0215 | −0.0212 | −0.0210 |
| 0.0378 | 0.0374 | 0.0371 | 0.0368 | 0.0364 | 0.0360 | 0.0356 |
| −0.0619 | −0.0614 | −0.0609 | −0.0603 | −0.0597 | −0.0591 | −0.0584 |
| 0.1030 | 0.1021 | 0.1012 | 0.1002 | 0.0992 | 0.0981 | 0.0970 |
| −0.1903 | −0.1884 | −0.1864 | −0.1843 | −0.1822 | −0.1799 | −0.1776 |
| 0.5680 | 0.5575 | 0.5470 | 0.5364 | 0.5259 | 0.5152 | 0.5046 |
| 0.6983 | 0.7078 | 0.7172 | 0.7264 | 0.7356 | 0.7446 | 0.7536 |
| −0.2053 | −0.2057 | −0.2059 | −0.2061 | −0.2061 | −0.2059 | −0.2056 |
| 0.1088 | 0.1088 | 0.1088 | 0.1086 | 0.1084 | 0.1082 | 0.1078 |
| −0.0651 | −0.0651 | −0.0650 | −0.0649 | −0.0648 | −0.0646 | −0.0643 |
| 0.0397 | 0.0397 | 0.0397 | 0.0396 | 0.0395 | 0.0394 | 0.0393 |
| −0.0234 | −0.0236 | −0.0236 | −0.0235 | −0.0235 | −0.0234 | −0.0234 |
| 0.0131 | 0.0131 | 0.0131 | 0.0131 | 0.0131 | 0.0131 | 0.0130 |
| −0.0065 | −0.0065 | −0.0065 | −0.0065 | −0.0065 | −0.0065 | −0.0065 |

Phases 78 through 84

| | | | | | | |
|---|---|---|---|---|---|---|
| −0.0055 | −0.0054 | −0.0053 | −0.0052 | −0.0051 | −0.0050 | −0.0049 |
| 0.0113 | 0.0112 | 0.0110 | 0.0109 | 0.0107 | 0.0105 | 0.0103 |
| −0.0207 | −0.0204 | −0.0202 | −0.0199 | −0.0196 | −0.0192 | −0.0189 |
| 0.0352 | 0.0347 | 0.0343 | 0.0338 | 0.0333 | 0.0328 | 0.0322 |
| −0.0577 | −0.0570 | −0.0563 | −0.0555 | −0.0547 | −0.0538 | −0.0530 |
| 0.0958 | 0.0946 | 0.0933 | 0.0919 | 0.0906 | 0.0892 | 0.0877 |
| −0.1752 | −0.1727 | −0.1701 | −0.1674 | −0.1647 | −0.1619 | −0.1590 |
| 0.4939 | 0.4832 | 0.4725 | 0.4618 | 0.4510 | 0.4403 | 0.4295 |
| 0.7624 | 0.7711 | 0.7797 | 0.7882 | 0.7965 | 0.8047 | 0.8128 |
| −0.2052 | −0.2047 | −0.2041 | −0.2033 | −0.2023 | −0.2012 | −0.2000 |
| 0.1074 | 0.1069 | 0.1064 | 0.1058 | 0.1051 | 0.1043 | 0.1035 |
| −0.0641 | −0.0638 | −0.0634 | −0.0630 | −0.0626 | −0.0621 | −0.0615 |
| 0.0391 | 0.0389 | 0.0387 | 0.0385 | 0.0382 | 0.0379 | 0.0376 |
| −0.0233 | −0.0232 | −0.0230 | −0.0229 | −0.0227 | −0.0226 | −0.0224 |
| 0.0130 | 0.0129 | 0.0129 | 0.0128 | 0.0127 | 0.0126 | 0.0125 |
| −0.0065 | −0.0065 | −0.0064 | −0.0064 | −0.0064 | −0.0063 | −0.0063 |

Phases 85 through 91

| | | | | | | |
|---|---|---|---|---|---|---|
| −0.0048 | −0.0047 | −0.0046 | −0.0045 | −0.0044 | −0.0043 | −0.0042 |
| 0.0101 | 0.0099 | 0.0097 | 0.0095 | 0.0093 | 0.0091 | 0.0089 |
| −0.0186 | −0.0183 | −0.0179 | −0.0176 | −0.0172 | −0.0168 | −0.0164 |
| 0.0317 | 0.0311 | 0.0305 | 0.0300 | 0.0293 | 0.0287 | 0.0281 |
| −0.0521 | −0.0511 | −0.0502 | −0.0492 | −0.0482 | −0.0472 | −0.0462 |
| 0.0862 | 0.0846 | 0.0831 | 0.0814 | 0.0798 | 0.0781 | 0.0764 |
| −0.1561 | −0.1531 | −0.1501 | −0.1469 | −0.1438 | −0.1405 | −0.1373 |
| 0.4188 | 0.4080 | 0.3973 | 0.3866 | 0.3758 | 0.3651 | 0.3545 |
| 0.8207 | 0.8285 | 0.8362 | 0.8437 | 0.8510 | 0.8582 | 0.8653 |
| −0.1987 | −0.1972 | −0.1956 | −0.1938 | −0.1919 | −0.1898 | −0.1876 |
| 0.1026 | 0.1016 | 0.1006 | 0.0994 | 0.0982 | 0.0970 | 0.0956 |
| −0.0610 | −0.0604 | −0.0597 | −0.0590 | −0.0583 | −0.0575 | −0.0567 |
| 0.0372 | 0.0369 | 0.0365 | 0.0360 | 0.0356 | 0.0351 | 0.0346 |
| −0.0222 | −0.0220 | −0.0217 | −0.0215 | −0.0212 | −0.0210 | −0.0207 |
| 0.0124 | 0.0123 | 0.0122 | 0.0121 | 0.0119 | 0.0118 | 0.0116 |
| −0.0063 | −0.0062 | −0.0062 | −0.0061 | −0.0060 | −0.0060 | 0.0059 |

Phases 92 through 98

| | | | | | | |
|---|---|---|---|---|---|---|
| −0.0041 | −0.0040 | −0.0039 | −0.0038 | −0.0037 | −0.0036 | −0.0035 |
| 0.0087 | 0.0085 | 0.0083 | 0.0080 | 0.0078 | 0.0076 | 0.0073 |
| −0.0161 | −0.0157 | −0.0153 | −0.0149 | −0.0145 | −0.0140 | −0.0136 |
| 0.0275 | 0.0268 | 0.0261 | 0.0254 | 0.0248 | 0.0241 | 0.0234 |
| −0.0452 | −0.0441 | −0.0430 | −0.0419 | −0.0408 | −0.0396 | −0.0385 |
| 0.0746 | 0.0728 | 0.0710 | 0.0691 | 0.0673 | 0.0654 | 0.0634 |
| −0.1339 | −0.1306 | −0.1272 | −0.1237 | −0.1202 | −0.1167 | −0.1131 |
| 0.3438 | 0.3332 | 0.3226 | 0.3120 | 0.3015 | 0.2911 | 0.2806 |
| 0.8722 | 0.8789 | 0.8855 | 0.8919 | 0.8982 | 0.9043 | 0.9102 |
| −0.1853 | −0.1828 | −0.1801 | −0.1774 | −0.1744 | −0.1713 | −0.1681 |
| 0.0942 | 0.0928 | 0.0912 | 0.0896 | 0.0879 | 0.0862 | 0.0844 |
| −0.0558 | −0.0549 | −0.0540 | −0.0530 | −0.0520 | −0.0509 | −0.0498 |
| 0.0341 | 0.0335 | 0.0330 | 0.0324 | 0.0317 | 0.0311 | 0.0304 |
| −0.0204 | −0.0200 | −0.0197 | −0.0193 | −0.0190 | −0.0186 | −0.0182 |
| 0.0115 | 0.0113 | 0.0111 | 0.0109 | 0.0107 | 0.0105 | 0.0103 |
| −0.0058 | −0.0057 | −0.0056 | −0.0055 | −0.0055 | −0.0054 | −0.0052 |

Phases 99 through 105

| | | | | | | |
|---|---|---|---|---|---|---|
| −0.0033 | −0.0032 | −0.0031 | −0.0030 | −0.0029 | −0.0028 | −0.0026 |
| 0.0071 | 0.0069 | 0.0066 | 0.0664 | 0.0062 | 0.0059 | 0.0057 |
| −0.0132 | −0.0128 | −0.0123 | −0.0119 | −0.0115 | −0.0110 | −0.0106 |
| 0.0226 | 0.0219 | 0.0212 | 0.0204 | 0.0197 | 0.0189 | 0.0182 |
| −0.0373 | −0.0361 | −0.0349 | −0.0337 | −0.0325 | −0.0312 | −0.0300 |
| 0.0615 | 0.0595 | 0.0575 | 0.0555 | 0.0535 | 0.0514 | 0.0494 |
| −0.1095 | −0.1059 | −0.1022 | −0.0985 | −0.0948 | −0.0911 | −0.0874 |
| 0.2703 | 0.2599 | 0.2497 | 0.2394 | 0.2293 | 0.2192 | 0.2092 |
| 0.9159 | 0.9215 | 0.9269 | 0.9321 | 0.9371 | 0.9420 | 0.9466 |
| −0.1647 | −0.1612 | −0.1575 | −0.1537 | −0.1498 | −0.1456 | −0.1414 |
| 0.0825 | 0.0805 | 0.0785 | 0.0764 | 0.0742 | 0.0720 | 0.0697 |
| −0.0486 | −0.0475 | −0.0462 | −0.0450 | −0.0437 | −0.0423 | −0.0410 |
| 0.0297 | 0.0290 | 0.0282 | 0.0275 | 0.0267 | 0.0259 | 0.0250 |
| −0.0178 | −0.0174 | −0.0169 | −0.0165 | −0.0160 | −0.0155 | −0.0150 |
| 0.0101 | 0.0098 | 0.0096 | 0.0093 | 0.0091 | 0.0088 | 0.0085 |
| −0.0051 | −0.0050 | −0.0049 | −0.0048 | −0.0046 | −0.0045 | −0.0044 |

Phases 106 through 112

| | | | | | | |
|---|---|---|---|---|---|---|
| −0.0025 | −0.0024 | −0.0023 | −0.0022 | −0.0020 | −0.0019 | −0.0018 |
| 0.0054 | 0.0052 | 0.0049 | 0.0047 | 0.0044 | 0.0042 | 0.0039 |
| −0.0101 | −0.0097 | −0.0092 | −0.0088 | −0.0083 | −0.0079 | −0.0074 |
| 0.0174 | 0.0167 | 0.0159 | 0.0151 | 0.0143 | 0.0135 | 0.0128 |
| −0.0287 | −0.0275 | −0.0262 | −0.0249 | −0.0236 | −0.0224 | −0.0211 |
| 0.0473 | 0.0452 | 0.0431 | 0.0410 | 0.0389 | 0.0368 | 0.0347 |
| −0.0836 | −0.0798 | −0.0761 | −0.0723 | −0.0685 | −0.0647 | −0.0609 |
| 0.1992 | 0.1894 | 0.1796 | 0.1698 | 0.1602 | 0.1507 | 0.1412 |
| 0.9511 | 0.9554 | 0.9595 | 0.9634 | 0.9671 | 0.9706 | 0.9740 |
| −0.1370 | −0.1324 | −0.1277 | −0.1228 | −0.1178 | −0.1127 | −0.1074 |
| 0.0674 | 0.0650 | 0.0625 | 0.0599 | 0.0574 | 0.0547 | 0.0520 |
| −0.0396 | −0.0381 | −0.0367 | −0.0351 | −0.0336 | −0.0320 | −0.0304 |
| 0.0242 | 0.0233 | 0.0224 | 0.0214 | 0.0205 | 0.0195 | 0.0186 |
| −0.0145 | −0.0140 | −0.0134 | −0.0129 | −0.0123 | −0.0117 | −0.0112 |
| 0.0082 | 0.0079 | 0.0076 | 0.0073 | 0.0070 | 0.0067 | 0.0064 |
| −0.0042 | −0.0041 | −0.0039 | −0.0038 | −0.0036 | −0.0035 | −0.0033 |

Phases 113 through 119

| | | | | | | |
|---|---|---|---|---|---|---|
| −0.0017 | −0.0016 | −0.0015 | −0.0014 | −0.0012 | −0.0011 | −0.0010 |
| 0.0037 | 0.0035 | 0.0032 | 0.0030 | 0.0027 | 0.0025 | 0.0022 |
| −0.0069 | −0.0065 | −0.0060 | −0.0056 | −0.0051 | −0.0047 | −0.0042 |
| 0.0120 | 0.0112 | 0.0104 | 0.0096 | 0.0088 | 0.0081 | 0.0073 |
| −0.0198 | −0.0185 | −0.0172 | −0.0159 | −0.0146 | −0.0133 | −0.0120 |
| 0.0325 | 0.0304 | 0.0283 | 0.0261 | 0.0240 | 0.0219 | 0.0198 |
| −0.0571 | −0.0533 | −0.0495 | −0.0457 | −0.0420 | −0.0382 | −0.0345 |
| 0.1318 | 0.1226 | 0.1134 | 0.1043 | 0.0953 | 0.0864 | 0.0777 |
| 0.9771 | 0.9800 | 0.9828 | 0.9853 | 0.9877 | 0.9898 | 0.9917 |
| −0.1020 | −0.0964 | −0.0907 | −0.0848 | −0.0788 | −0.0727 | −0.0664 |
| 0.0492 | 0.0464 | 0.0435 | 0.0406 | 0.0376 | 0.0346 | 0.0315 |
| −0.0288 | −0.0271 | −0.0254 | −0.0237 | −0.0219 | −0.0201 | −0.0183 |
| 0.0176 | 0.0165 | 0.0155 | 0.0144 | 0.0134 | 0.0123 | 0.0112 |
| −0.0106 | −0.0099 | −0.0093 | −0.0087 | −0.0080 | −0.0074 | −0.0067 |
| 0.0060 | 0.0057 | 0.0053 | 0.0050 | 0.0046 | 0.0042 | 0.0038 |
| −0.0031 | −0.0029 | −0.0028 | −0.0026 | −0.0024 | −0.0022 | −0.0020 |

TABLE 4-continued

Filter information for a Kaiser-window based interpolator (γ = 5)

Phases 120 through 126

| | | | | | | |
|---|---|---|---|---|---|---|
| −0.0009 | −0.0008 | −0.0007 | −0.0006 | −0.0005 | −0.0004 | −0.0003 |
| 0.0020 | 0.0017 | 0.0015 | 0.0013 | 0.0010 | 0.0008 | 0.0006 |
| −0.0037 | −0.0033 | −0.0028 | −0.0024 | −0.0020 | −0.0015 | −0.0011 |
| 0.0065 | 0.0057 | 0.0049 | 0.0042 | 0.0034 | 0.0026 | 0.0019 |
| −0.0107 | −0.0094 | −0.0082 | −0.0069 | −0.0056 | −0.0044 | −0.0031 |
| 0.0176 | 0.0155 | 0.0134 | 0.0113 | 0.0092 | 0.0072 | 0.0051 |
| −0.0307 | −0.0270 | −0.0233 | −0.0197 | −0.0160 | −0.0124 | −0.0088 |
| 0.0690 | 0.0604 | 0.0520 | 0.0437 | 0.0355 | 0.0274 | 0.0194 |
| 0.9935 | 0.9950 | 0.9963 | 0.9975 | 0.9984 | 0.9991 | 0.9996 |
| −0.0600 | −0.0534 | −0.0467 | −0.0399 | −0.0329 | −0.0258 | −0.0186 |
| 0.0283 | 0.0252 | 0.0219 | 0.0187 | 0.0154 | 0.0120 | 0.0086 |
| −0.0165 | −0.0146 | −0.0127 | −0.0108 | −0.0089 | −0.0070 | −0.0050 |
| 0.0101 | 0.0089 | 0.0078 | 0.0066 | 0.0054 | 0.0042 | 0.0030 |
| −0.0061 | −0.0054 | −0.0047 | −0.0040 | −0.0033 | −0.0026 | −0.0018 |
| 0.0035 | 0.0031 | 0.0027 | 0.0023 | 0.0019 | 0.0015 | 0.0011 |
| −0.0018 | −0.0016 | −0.0014 | −0.0012 | −0.0010 | −0.0008 | −0.0006 |

Phases 127 through 128

| | |
|---|---|
| −0.0002 | −0.0001 |
| 0.0003 | 0.0001 |
| −0.0006 | −0.0002 |
| 0.0011 | 0.0004 |
| −0.0019 | −0.0006 |
| 0.0030 | 0.0010 |
| −0.0053 | −0.0018 |
| 0.0115 | 0.0038 |
| 0.9999 | 1.0000 |
| −0.0113 | −0.0038 |
| 0.0052 | 0.0017 |
| −0.0030 | −0.0010 |
| 0.0018 | 0.0006 |
| −0.0011 | −0.0004 |
| 0.0006 | 0.0002 |
| −0.0003 | −0.0001 |

TABLE 5

Filter information for a 5 × 5 edge extractor for Gain k = 1 (Marr filter)

| | | | | |
|---|---|---|---|---|
| −0.0037 | −0.0037 | −0.0037 | −0.0037 | −0.0037 |
| −0.0037 | −0.0037 | −0.0054 | −0.0037 | −0.0037 |
| −0.0037 | −0.0054 | 0.0946 | −0.0054 | −0.0037 |
| −0.0037 | −0.0037 | −0.0054 | −0.0037 | −0.0037 |
| −0.0037 | −0.0037 | −0.0037 | −0.0037 | −0.0037 |

Although the invention has been described thus far in terms of a interpolators based on Kaiser windowed sinc functions and raised-cosine functions, it is contemplated that other types of interpolation functions may be used. For example, a suitable filter may be designed as a generalized frequency domain least square (LS) FIR design that enables frequency-domain weighting of the LS error, any such interpolator can be used as long as the design criteria set forth above are considered. Alternatively, windowed sinc functions with different (or same) windowing functions and/or different parameters can also be used. Ideally, the characteristics of the two interpolators should be complementary. The interpolator preceding the edge extractor is desirably be relatively flat in the passband to protect the high frequency content of the image. This interpolator also desirably has a reasonably sharp cut-off without causing excessive edge ringing. Additionally, the other interpolator desirably has a more gradual roll-off at the band edge so as to minimize ringing artifacts and also has good stopband attenuation so as to minimize aliasing errors.

Figure 9:
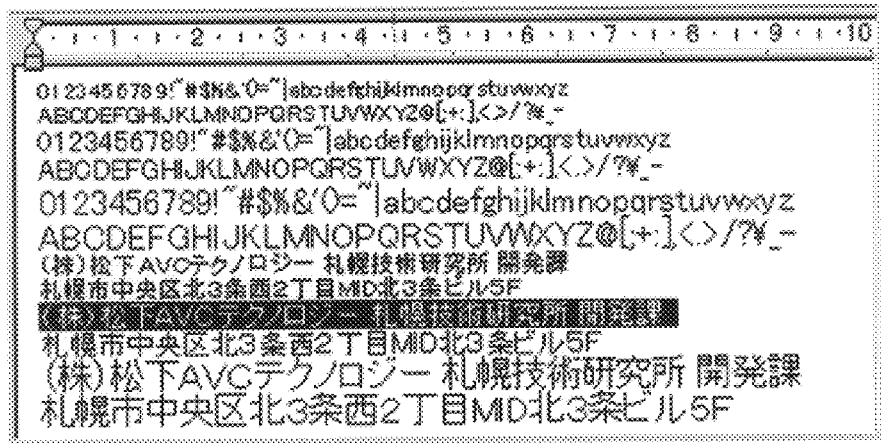
FIG. 9 (Prior Art) is an example of an original text image which is used for describing the operation of the present invention.
Figure 10A:
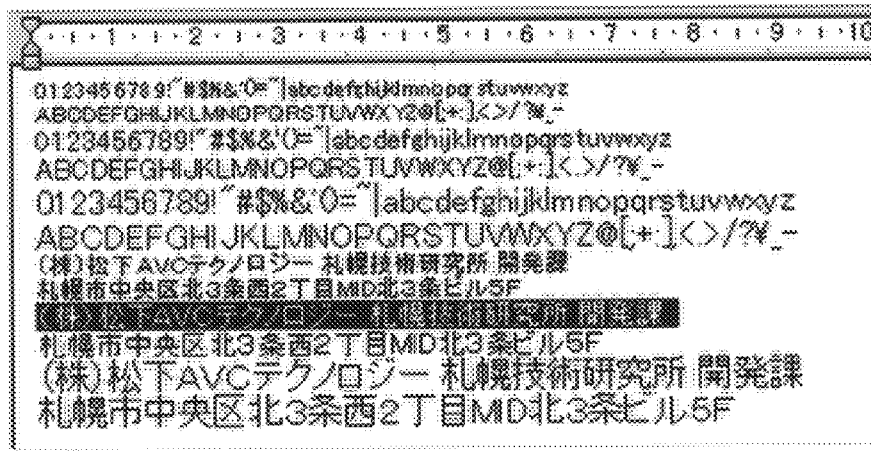
FIG. 10a (Prior Art) is a text diagram which shows an example of an up-conversion using a single interpolator.
Figure 10B:
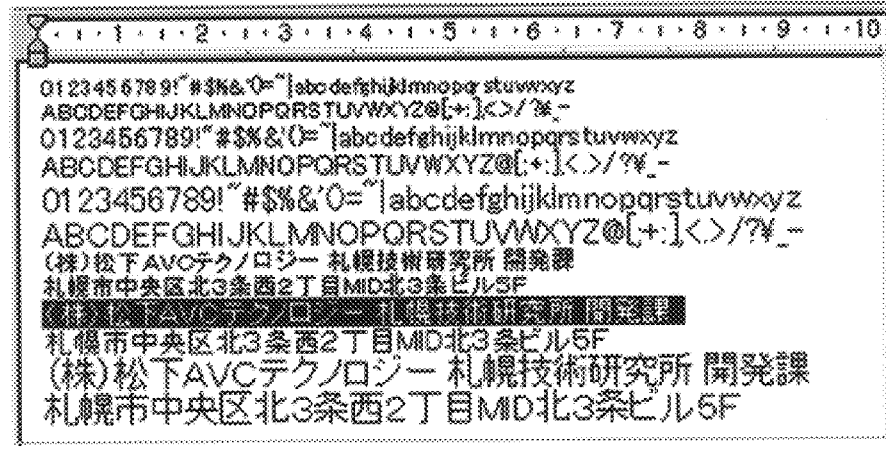
FIG. 10b is a text diagram which shows an example of an up-conversion using the universal format conversion architecture shown in FIG. 8.

FIGS. 9, 10A, and 10b show an original image and two up-converted text images, respectively. All of these images have been contrast enhanced to more clearly show the presence or absence of ringing artifacts. FIG. 10a is obtained using only a Kaiser windowed sinc interpolator ($\beta$=5) implemented using a 16-tap 12-bit and 128-phase 1-D FIR filter. Strong ringing artifacts can be seen around each character that interferes with its readability. It is evident that a windowed sinc interpolator alone is unable to produce satisfactory scaling without compromising the result.

FIG. 10b is produced using the new format conversion architecture shown in FIG. 8 with an identical Kaiser windowed sinc interpolator and a raised-cosine interpolator with 50% roll-off. The scaled text is more pleasant to read with virtually no visible ringing artifacts.

Figure 11:
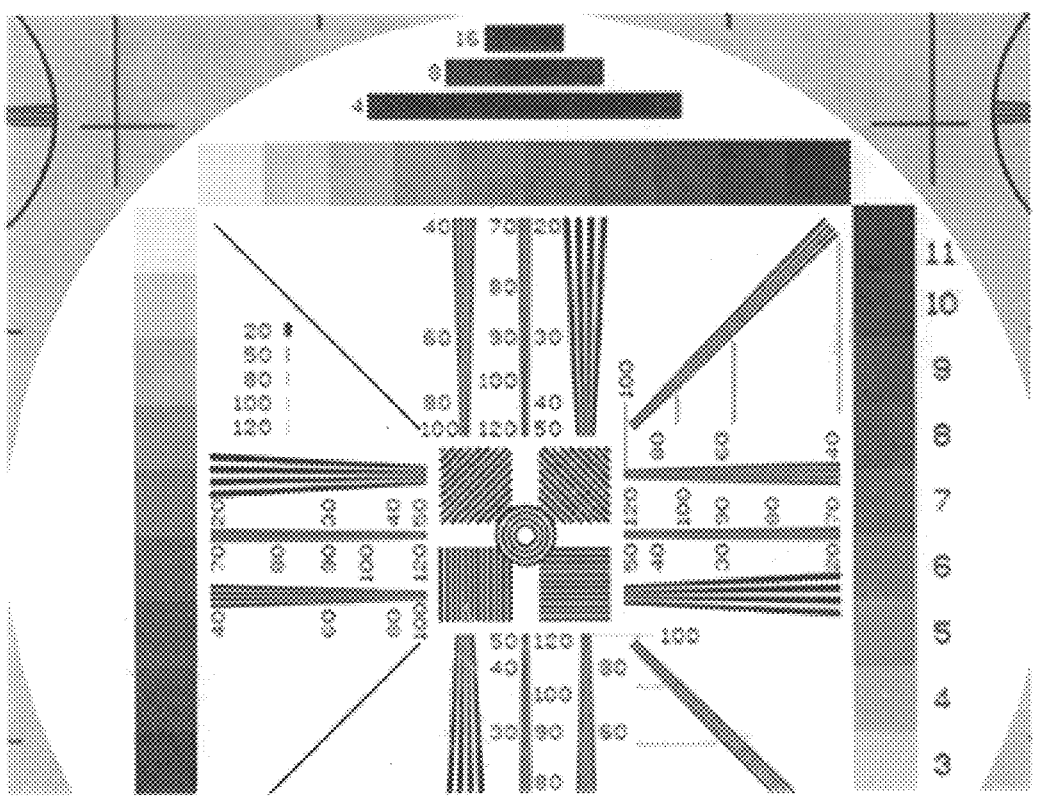
FIG. 11 (prior art) is an image diagram of a television test pattern.
Figure 12A:
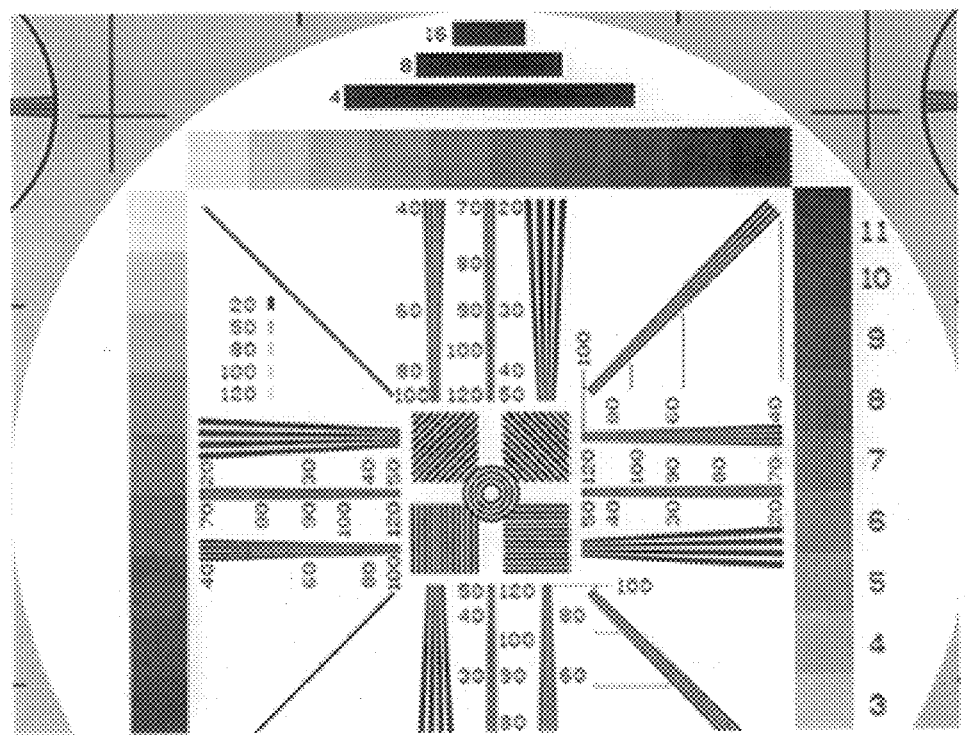
FIGS. 12a is an image diagram of the test pattern shown in FIG. 11 up-converted using a single interpolator.
Figure 12B:
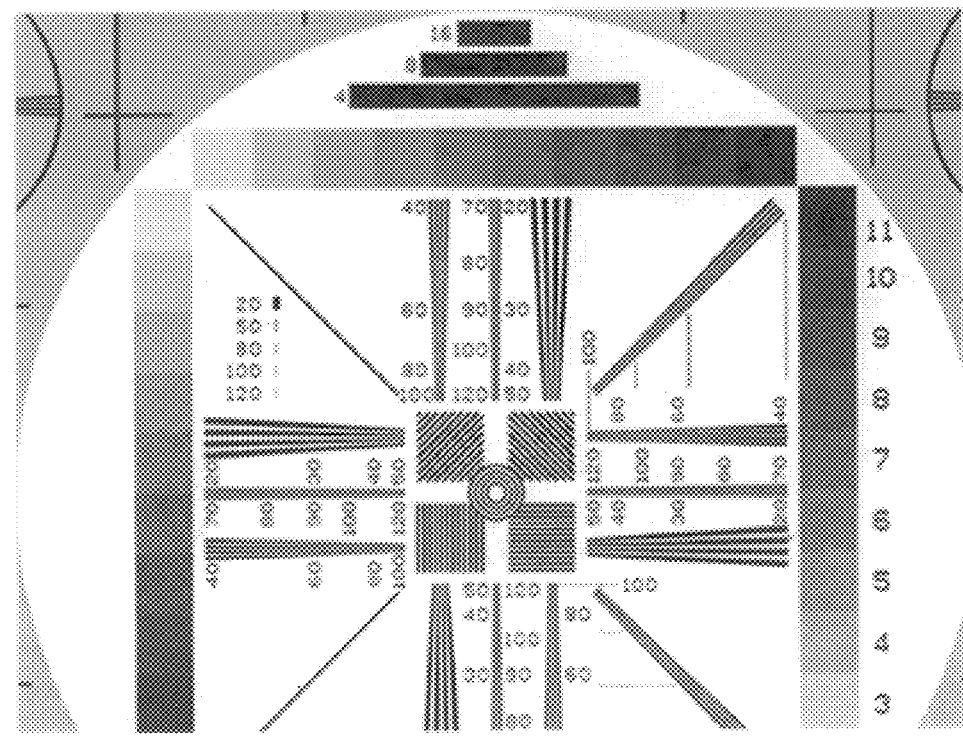
FIG. 12b is an image diagram of the test pattern shown in FIG. 11 up-converted using the universal format conversion architecture shown in FIG. 8.
Figure 13A:
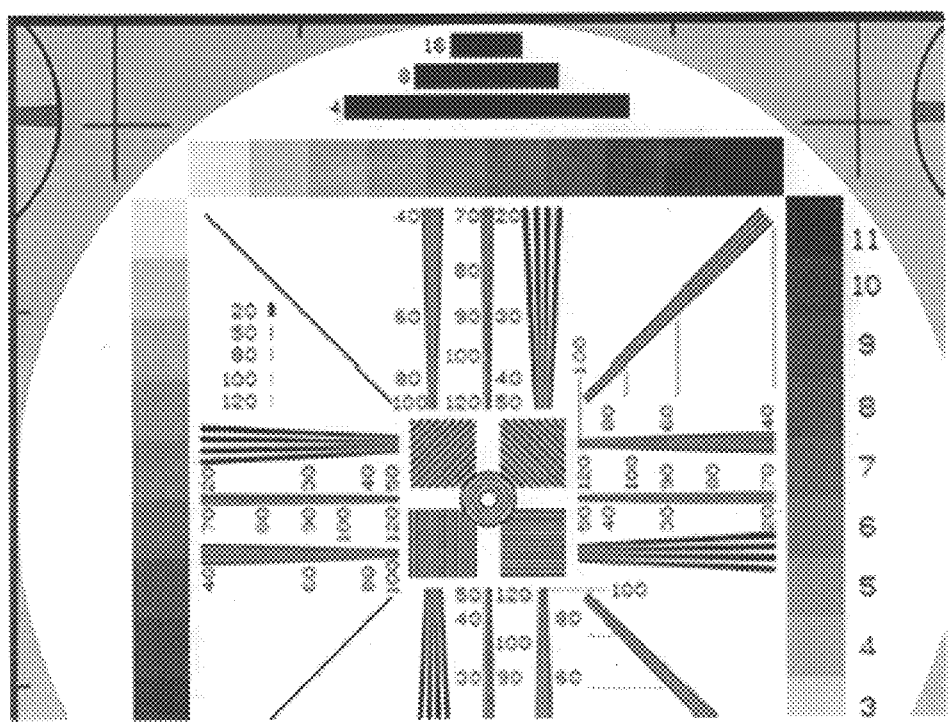
FIGS. 13a is an image diagram of the test pattern shown in FIG. 11 down-converted using a single interpolator.
Figure 13B:
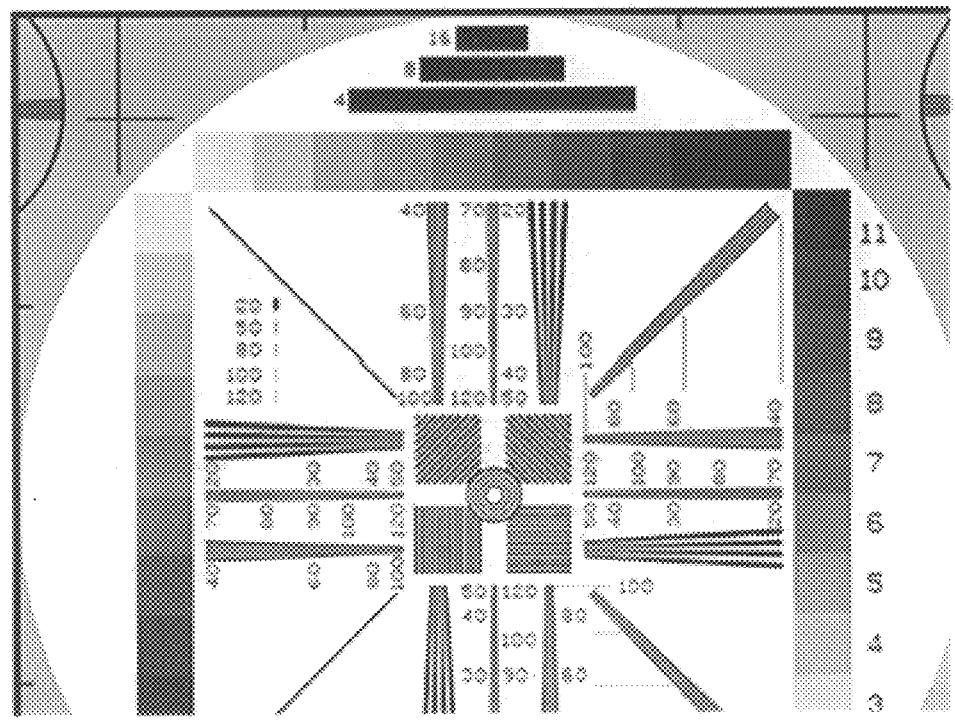
FIG. 13b is an image diagram of the test pattern shown in FIG. 11 down-converted using the universal format conversion architecture shown in FIG. 8.

The disclosed scaling architecture is suitable for traditional video scaling applications, as shown by the up and down-converted TV test patterns in FIGS. 12a and 12b, and FIGS. 13a and 13b, respectively, while FIG. 11 shows the original test pattern. The proposed scaling method produces virtually an identical image to that of a single interpolator and, therefore, no compromise is made for traditional video scaling. The simulations on the test images confirms the effectiveness of the new scaling method when compared with the scaling technique where only one interpolator is used.

Digital video format conversion allows video post-production facilities to serve a broad range of clients who will be working in a variety of standards in current DTV multi-format broadcasting environment. In addition, format conversion gives post-processing facilities the freedom to utilize any program asset regardless of its origin. Although many video/graphics workstations offer image-scaling capability in software, dedicated hardware solutions will prove to be a more efficient alternative. The present invention uses an efficient 2-pass 1-D interpolation architecture as described above. To eliminate the ringing artifacts found typically in a scaled CGI, the new universal format conversion architecture uses two FCs. The primary difference between the two FCs is that their interpolation kernels are programmed to have complementary frequency response characteristics. Therefore, one interpolator produces less aliasing and blurring while the other produces less ringing. By using an edge extraction technique, the two scaled images are fused into the one that has the best performance for simultaneous video and CGI scaling.

While this invention has been described with reference to specific embodiments, it is not necessarily limited thereto. Accordingly, the appended claims should be construed to encompass not only those forms and embodiments of the invention specifically described above, but to such other forms and embodiments as may be devised by those skilled in the art without departing from its scope as defined by the appended claims.

What is claimed:

1. A method for scaling an input image which includes both video and computer generated image components, comprising the steps of:
    a) generating a first intermediate scaled image by processing the input image with a first frequency response characteristic that has a passband and a stop band and a transition band between the passband and the stop band;
    b) processing the first intermediate scaled image to extract a scaled edge image therefrom;
    c) generating a second intermediate scaled image by processing the input image with a second frequency response characteristic that has a passband and a stop band and a transition band between the passband and the stop band, the transition band of the second frequency response characteristic being more gradual than the transition band of the first frequency response characteristic; and d) adding the scaled edge image to the second intermediate scaled image to produce the output image.

2. A method according to claim 1, wherein:
the step of generating the first intermediate scaled image includes the step of convolving the input image with a Kaiser windowed sinc function; and
the step of generating the second intermediate scaled image includes the step of convolving the input image with a truncated raised cosine function.

3. A method according to claim 1, wherein the step of processing the first intermediate scaled image to extract a scaled edge image therefrom includes the step of processing the first intermediate scaled image through a Marr filter.

4. A method according to claim 1, wherein the input image is a two-dimensional (2-D) image and the step of generating the first scaled image includes the steps of:
processing the input image with a first one-dimensional (1-D) frequency response characteristic to produce a horizontally filtered image;
transposing the horizontally filtered image; and
processing the transposed horizontally filtered image with the 1-D frequency response characteristic to produce a horizontally and vertically filtered image;
wherein the 1-D frequency response characteristic has the passband, transition band and stop band of the first frequency response characteristic.

5. A system for scaling an input image which includes both video and computer generated imagery, comprising:
a) a first interpolator having a frequency response characteristic which defines a passband, a stop band and a transition band between the passband and the stop band for processing the input image to produce a first intermediate scaled image;
b) an edge extractor which processes the first intermediate scaled image to extract a scaled edge image therefrom;
c) a second interpolator having a frequency response characteristic which defines a passband, a stop band and a transition band between the passband and the stop band for processing the input image to produce a second intermediate scaled image, wherein the transition band of the second interpolator is more gradual than the transition band of the first interpolator; and
d) an adder for adding the scaled edge image to the second intermediate scaled image.

6. A system according to claim 5, wherein the frequency response characteristic of the first interpolator is a third-order frequency response characteristic.

7. A system according to claim 6, wherein the first interpolator is a Kaiser windowed sinc Interpolator, the second interpolator is a raised-cosine interpolator.

8. A system according to claim 7, wherein the edge extractor is a Marr filter.

9. A system according to claim 5, wherein the input image is a two-dimensional (2-D) image defined by a sequence of horizontal lines of samples, and the first interpolator includes:
a first one-dimensional (1-D) interpolator which processes the input image to generate a horizontally filtered image;
a transpose memory coupled to receive the horizontally filtered image and to provide the horizontally filtered image as a sequence of vertical lines of samples;
a second 1-D interpolator which processes the horizontally filtered image provided by the transpose memory to produce a horizontally and vertically filtered image; and
a second transpose memory coupled to receive the horizontally and vertically filtered image as a sequence of vertical lines of samples and to provide the horizontally and vertically filtered image as a sequence of horizontal lines of samples.

10. A system for scaling an input image which includes both video and computer generated imagery, comprising:
a) a first interpolator having an input port coupled to receive the input image and an output port, the first interpolator having a frequency response characteristic which defines a passband, a stop band and a transition band between the passband and the stop band;
b) an edge extractor having an input port and an output port, the input port being coupled to the output port of the first interpolator;
c) a second interpolator having an input port coupled to receive the input image and an output port, the second interpolator having a frequency response characteristic which defines a passband, a stop band and a transition band between the passband and the stop band, wherein the transition band of the second interpolator is more gradual than the transition band of the first interpolator; and
d) an adder for adding having a first input port coupled to the output port of the edge extractor and a second input port coupled to the output port of the second interpolator.

11. A system according to claim 10, wherein:
the first interpolator is a Kaiser windowed sinc interpolator;
the second interpolator is a raised cosine interpolator; and
the edge extractor is a Marr filter.

12. A carrier encoded with a computer program which, when executed causes a computer to scale an input image which includes both video and computer generated image components, the computer program causing the computer to perform the steps of:
a) generating a first intermediate scaled image by processing the input image with a first frequency response characteristic that has a passband and a stop band and a transition band between the passband and the stop band;
b) processing the first intermediate scaled image to extract a scaled edge image therefrom;
c) generating a second intermediate scaled image by processing the input image with a second frequency response characteristic that has a passband and a stop band and a transition band between the passband and the stop band, the transition band of the second frequency response characteristic being more gradual than the transition band of the first frequency response characteristic; and
d) adding the scaled edge image to the second intermediate scaled image to produce the output image.

13. A carrier according to claim 12, wherein the input image is a two-dimensional (2-D) image and the step of generating the first scaled image includes the steps of:
processing the input image with a first one-dimensional (1-D) frequency response characteristic to produce a horizontally filtered image;
transposing the horizontally filtered image; and
processing the transposed horizontally filtered image with the 1-D frequency response characteristic to produce a horizontally and vertically filtered image;
wherein the 1-D frequency response characteristic has the passband, transition band and stop band of the first frequency response characteristic.

* * * * *